(12) United States Patent
Kamo

(10) Patent No.: US 7,050,239 B2
(45) Date of Patent: May 23, 2006

(54) REAL IMAGE MODE VARIABLE MAGNIFICATION FINDER

(75) Inventor: Yuji Kamo, Hino (JP)

(73) Assignee: Olympus Corporation, Tokyo (JP)

( * ) Notice: Subject to any disclaimer, the term of this patent is extended or adjusted under 35 U.S.C. 154(b) by 796 days.

(21) Appl. No.: 09/957,475

(22) Filed: Sep. 21, 2001

(65) Prior Publication Data

US 2002/0097497 A1    Jul. 25, 2002

(30) Foreign Application Priority Data

Sep. 26, 2000 (JP) .............................. 2000-292251

(51) Int. Cl.
*G02B 15/15* (2006.01)
(52) U.S. Cl. .................. 359/676; 359/720; 359/726
(58) Field of Classification Search ................ 359/676, 359/720, 726
See application file for complete search history.

(56) References Cited

U.S. PATENT DOCUMENTS

| | | | |
|---|---|---|---|
| 5,231,534 A | 7/1993 | Kato | 359/432 |
| 5,323,264 A | 6/1994 | Kato | 359/432 |
| 5,627,618 A | 5/1997 | Kasai et al. | 396/379 |
| 6,041,193 A * | 3/2000 | Aoki | 396/379 |

FOREIGN PATENT DOCUMENTS

| | | |
|---|---|---|
| EP | 0722106 A2 | 7/1996 |
| JP | HEI05-93863 | 4/1993 |
| JP | HEI06-300971 | 10/1994 |
| JP | HEI10-197796 | 7/1998 |
| JP | HEI10-333041 | 12/1998 |
| JP | HEI11-38472 | 2/1999 |
| JP | HEI11-38473 | 2/1999 |
| JP | HEI11-84247 | 3/1999 |

* cited by examiner

*Primary Examiner*—Hung Xuan Dang
*Assistant Examiner*—Joseph Martinez
(74) *Attorney, Agent, or Firm*—Kenyon & Kenyon

(57) ABSTRACT

A real image mode variable magnification finder optical system comprises a variable magnification objective optical system having a positive optical power, an ocular optical system having a positive optical power, and a plurality of reflecting surfaces for erecting an image. The objective optical system comprises a plurality of movable lens units and at least one rotationally asymmetric reflecting surface having an optical power, and the reflecting surface participating in the function of the objective optical system and in the function of erecting an image. Each of the lens unit included in the objective optical system has at least one aspherical surface. The finder optical system satisfies the following condition:

$$0.02 < d \cdot (fw/ft^2) < 0.4.$$

where d is a distance from a first surface of the objective optical system to one of the reflecting surfaces positioned nearest to an object measured along an axial chief ray at a wide angle end, fw is a focal length of the objective optical system at a wide angle end, and ft is a focal length of the objective optical system at a telephoto end.

43 Claims, 21 Drawing Sheets

REAL IMAGE MODE VARIABLE MAGNIFICATION FINDER

CROSS-REFERENCE TO RELATED APPLICATION

This invention claims benefits of Patent Application No. 2000-292,251, filed on Sep. 26, 2000, in Japan, the contents of which is hereby incorporated by reference.

BACKGROUND OF THE INVENTION

1. Field of the Invention

This invention relates to a real image mode variable magnification finder having an objective optical system, an ocular optical system and a plurality of reflecting surfaces for erecting an image of an object to be observed.

2. Description of the Related Art

In contrast to a single lens reflex camera, a compact size camera such as so-called lens-shutter cameras has a finder separate from its picture taking optical system. As a finder optical system, a real image mode finder which has an objective optical system, an ocular optical system and a plurality of reflecting surfaces for erecting an image of an object to be observed is well known.

In recent years, the need has become more and more intense in the marketplace for a camera having a high zooming ratio and small body, particularly in the light entering direction.

Generally speaking, in order to increase the zooming ratio, a zoom lens must have lens units having strong optical powers or large amounts of movement in the direction of an optical axis. However, the ability to strengthen the optical power is limited because it causes large aberrations. Therefore, to increase the zooming ratio, it is inevitably to increase the amount of movement of the movable lens units. This results in a thick camera body. For a picture taking optical system, a so-called collapsible lens mechanism can be used in which the lens barrel is telescopically collapsible into the camera body when the camera is not in use. This helps to miniaturize the camera thickness.

However, using a collapsible mechanism for the finder optical system is not desirable for camera styling and the thickness thereof nowadays has become one of the major hurdles to miniaturize the camera body.

On the other hand, to attain high zooming ratio and small change in aberration with zooming operation, the number of lens units in the finder optical system must be increased.

This causes a large sum total of lens thickness and therefore, is undesirable with regard to miniaturizing the thickness of the camera body.

Japanese laid open unexamined patent publication Hei 5-53,054 (counterpart U.S. Pat. No. 5,231,534 and No. 5,323,264) discloses a conventional finder optical system having an objective lens system including a first negative lens unit, a second positive lens unit and a third negative lens unit in this order from an object side, in which the first and second lens units are movable for zooming. The third lens unit is fixed during zooming operation and includes a lens or a prism having a negative optical power on the entrance surface thereof. The objective lens system includes a negative lens unit at rearmost side thereof (pupil side of the user) and has small thickness, obtained by adopting a so-called telephoto type power arrangement. U.S. Pat. No. 5,231,534 discloses, particularly in FIG. 2 and FIG. 7, a finder optical system having an objective lens system made up a first negative lens unit, a second positive lens unit, a third positive lens unit and a fourth negative lens unit in this order from an object side, in which the second and third lens units are movable for zooming. This finder optical system also uses the so-called telephoto type power arrangement.

Japanese laid open unexamined patent publications Hei 5-93,863, Hei 6-300,971, and Hei 7-13,076(counterpart U.S. Pat. No. 5,627,618) discloses a finder optical system having an objective lens system including a first positive lens unit, a second negative lens unit, a third negative lens unit and a fourth positive lens unit in this order from an object side, and in which the second and third lens units are movable for zooming. A partial optical system including the first through third lens unit and having a negative optical power as a whole forms a virtual image of an object and the fourth fixed lens unit forms a real image of the object.

On the other hand, a real image mode finder optical system is proposed in which a reflecting surface for erecting an image has an optical power and also participates in image formation of an objective lens system and/or image magnification of an ocular lens system for miniaturizing the size thereof. The reflecting surface is embodied in two types of optical elements—one is a reflecting mirror and the other is a reflecting prism. These two types of optical elements have different optical properties. The optical power of a reflecting surface of a prism having radius of curvature r is $-2n/r$ where n is a refractive index of the incident and exit side of the reflecting surface. On the other hand, the optical power of a reflecting surface of a mirror is $-2/r$ which is different from the optical power of the prism. The same optical power can be obtained by smaller curvature in a prism than in a mirror. Therefore, a prism is advantageous to reduce aberrations. In addition, a prism has two refracting surfaces, an entrance surface and an exit surface, in addition to the reflecting surface. These three surfaces all contribute to correction of aberrations and therefore, a prism is further advantageous for reducing aberrations as compared to a mirror. Further, a prism is made of a medium having refractive index more than 1 and a larger optical path length can be obtained with a prism than with a mirror.

On the other hand, a reflecting surface is more sensitive to decentering error and requires higher assembly precision than a refracting surface. In the finder optical system having a plurality of reflecting surfaces, a prism is advantageous because the plurality of reflecting surfaces can be arranged on a single optical element and the positional relationship therebetween is more easily set precisely in a prism optical system than in a mirror optical system.

As is apparent from the foregoing, a prism is superior to a mirror when a reflecting surface has a curvature and an optical power.

Japanese laid open unexamined patent publication Hei 8-248,481 (counterpart European patent application No.722, 106) discloses a real image mode finder optical system including a prism disposed on the side of an objective optical system having a rotationally symmetric curved aspherical reflecting surface. The objective lens systems thereof have variable focal lengths in the illustrated embodiments.

Japanese laid open unexamined patent publication Hei 10-197,796 discloses a large number of embodiments of a real image mode finder optical system using a rotationally asymmetric curved surface in the prism having an image erecting reflection surface in order to obtain a small and high performance finder. Among them, however, only six embodiments are actually designed in detail by conducting a light ray tracing. They are all directed to miniaturizing a finder by incorporating the function of an ocular optical system to the prism. Only the sixth embodiment includes numerical data for an objective optical system but no rotationally asymmetric surface is used in an optical system forming a real image of an object.

Japanese laid open unexamined patent publication Hei 10-333,041 discloses a real image mode finder optical system comprising a prism disposed on the side of an objective optical system having a rotationally asymmetric curved reflecting surface. The objective lens system thereof has a fixed focal length. Japanese laid open unexamined patent publications Hei 11-38,472 and Hei 11-38,473 disclose a real image mode variable magnification finder including a variable magnification objective lens system having a zooming ratio of 2.5 to 3.5. A rotationally asymmetric reflecting surface is provided on a prism disposed on an object side in a Porro prism for erecting an image.

Japanese laid open unexamined patent publication Hei 11-84,247 discloses a real image mode finder including a prism having a rotationally asymmetric reflecting surface. In this finder optical system, an image of an object is erected by relaying an image formed by an objective lens one more time with a relay lens system. An optical axis which enters the objective lens system and that which exits from the ocular lens system are approximately parallel with each other. The objective lens system has a fixed focal length.

The above described conventional finder optical systems involve drawbacks mentioned below.

In the finder optical system disclosed in Japanese laid open unexamined patent publication Hei 5-53,054, as the optical power of the third negative lens unit becomes strong, the positive power of the second lens unit also necessarily become strong. In the finder optical system disclosed in U.S. Pat. No. 5,231,534, as the optical power of the fourth negative lens unit becomes strong, the composite positive optical power of the second and third lens units also necessarily becomes strong. These conditions make it difficult to attain good imaging performance. Therefore, there is a limit to the ability to reduce the length (thickness) of the finder by means of increasing the optical powers of each lens units. Moreover, as a large back focal distance is required to place an optical element having an optical power after the third lens unit, a so-called inverted telephoto type power arrangement is adopted for the objective lens system. This makes it difficult to reduce the length of the finder optical system.

In Japanese laid open unexamined patent publications Hei 5-93,863, Hei 6-300,971 and Hei 7-13,076, the structure of the fourth lens unit is very important because the virtual image formed by the first through third lens units is magnified by the fourth lens unit. However, the fourth lens unit must be positioned near the object side in order to maintain a long back focal distance. Therefore, a magnification power shared by the fourth lens unit is limited to some extent and miniaturization of the finder is unsatisfactorily achieved. Moreover, the fourth lens unit is including a single lens element and has a limited ability for correcting aberrations. This is disadvantageous when it is desired to make the zooming ratio high.

It is possible to achieve both high zooming ratio and good imaging performance by constructing the fourth lens unit of a plurality of lens elements. However, this will result in a thick fourth lens unit and is disadvantageous in regard to miniaturizing the finder.

In the zoom optical system, the lens configuration and power layout for each lens unit, especially the movable lens units are important to obtain a zoom optical system that is small and has a high zooming ratio. As a zoom optical system and a fixed focal length optical system are very much different in structure and character, even when technologies useful for an fixed focal length optical system are applied to a zoom optical system, the same effects and advantages are not always obtainable.

Japanese laid open unexamined patent publications Hei 10-333,041 and 11-84,247 do not disclose a zoom optical system nor suggest applying the optical system disclosed therein to a zoom optical system. On the other hand, Japanese laid open unexamined patent publications Hei 8-248,481 discloses a zoom optical system but the imaging performance is limited to a conventional level. Therefore, a zoom optical system having high zooming ratio which is small in size will be difficult to be achieved even when considering these prior art.

The finder optical systems disclosed in Japanese laid open unexamined patent publications Hei 11-38,472 and 11-38,473 are unsatisfactorily miniaturized because the type of the objective lens system, the number of reflecting surfaces, the optical power arrangement, or the like, are not optimized. Besides, the zooming ratios obtained by ray tracing of the disclosed embodiments are within a range from around 2.1 to 2.8 and not satisfactorily large.

As mentioned above, these conventional finder optical systems do not satisfy the requirement of miniaturization or high zooming ratio and there is no finder optical system to realize these two requirement at the same time.

BRIEF SUMMARY OF THE INVENTION

According to this invention, a real image mode finder optical system is obtained which comprises a variable magnification objective optical system, an ocular optical system and a plurality of reflecting surfaces for erecting an image observed through the ocular optical system, with a large zooming ratio, good imaging performance and small size.

In one aspect of this invention, the objective optical system comprises a plurality of movable lens units, each of which has an aspherical surface, and at least one reflecting surface having an optical power and formed in a rotationally asymmetric shape.

In another aspect of this invention, the objective optical system comprises, in order from an object side, a front subsystem including a plurality of movable lens units and having a negative optical power, and a rear subsystem including at least one reflecting surface having a positive optical power and formed in a rotationally asymmetric shape.

In still another aspect of this invention, the objective optical system comprises, in order from an object side, a front subsystem including at least one fixed lens unit, a plurality of movable lens units and having a positive optical power, and a rear subsystem including at least one reflecting surface having a negative optical power and formed as a rotationally asymmetric shape. Each lens unit in the front subsystem includes at least one aspherical surface.

In still another aspect of this invention, the objective optical system comprises, in order from an object side, a plurality of movable lens units and a prism which has an entrance surface having a positive optical power, and a first reflecting surface formed as a rotationally asymmetric surface successive to the entrance surface and having a positive optical power.

In still another aspect of this invention, the objective optical system comprises, in order from an object side, a plurality of movable lens units and a prism which has an entrance surface having a negative optical power, and a first reflecting surface formed as a rotationally asymmetric surface successive to the entrance surface and having a negative optical power.

In still another aspect of this invention, the objective optical system comprises a plurality of movable lens units and, in order from an object side, a negative reflecting surface, a negative reflecting surface and a positive reflecting surface. At least one of the three reflecting surfaces is a rotationally asymmetric surface.

In still another aspect of this invention, the objective optical system comprises a plurality of movable lens units and, in order from an object side, a positive reflecting surface, a positive reflecting surface and a negative reflecting surface. At least one of the three reflecting surfaces is a rotationally asymmetric surface.

In still another aspect of this invention, the objective optical system comprises at least three lens units and at least three reflecting surfaces at least one of which is a rotationally asymmetric surface.

In still another aspect of this invention, the objective optical system comprises at least three lens units aligned on a common optical axis, two reflecting surfaces at least one of which is a rotationally asymmetric surface, and a prism having an entrance surface and an exit surface at least one of which is a rotationally asymmetric surface.

As described above, by using a rotationally asymmetric surface to correct decentering aberrations, that is, rotationally asymmetric aberrations caused by decentered refractive or reflective optical surfaces, a real image mode variable magnification finder which is small in size and has excellent imaging performance can be realized. These finder optical systems are suitable for photographic cameras, video cameras, and the like.

Other features and advantages of this invention are explained based on many diagrammatic and numerical examples given in detail below.

BRIEF DESCTIPTION OF THE DRAWINGS

DETAILED DESCRIPTION OF THE INVENTION

Figure 1:
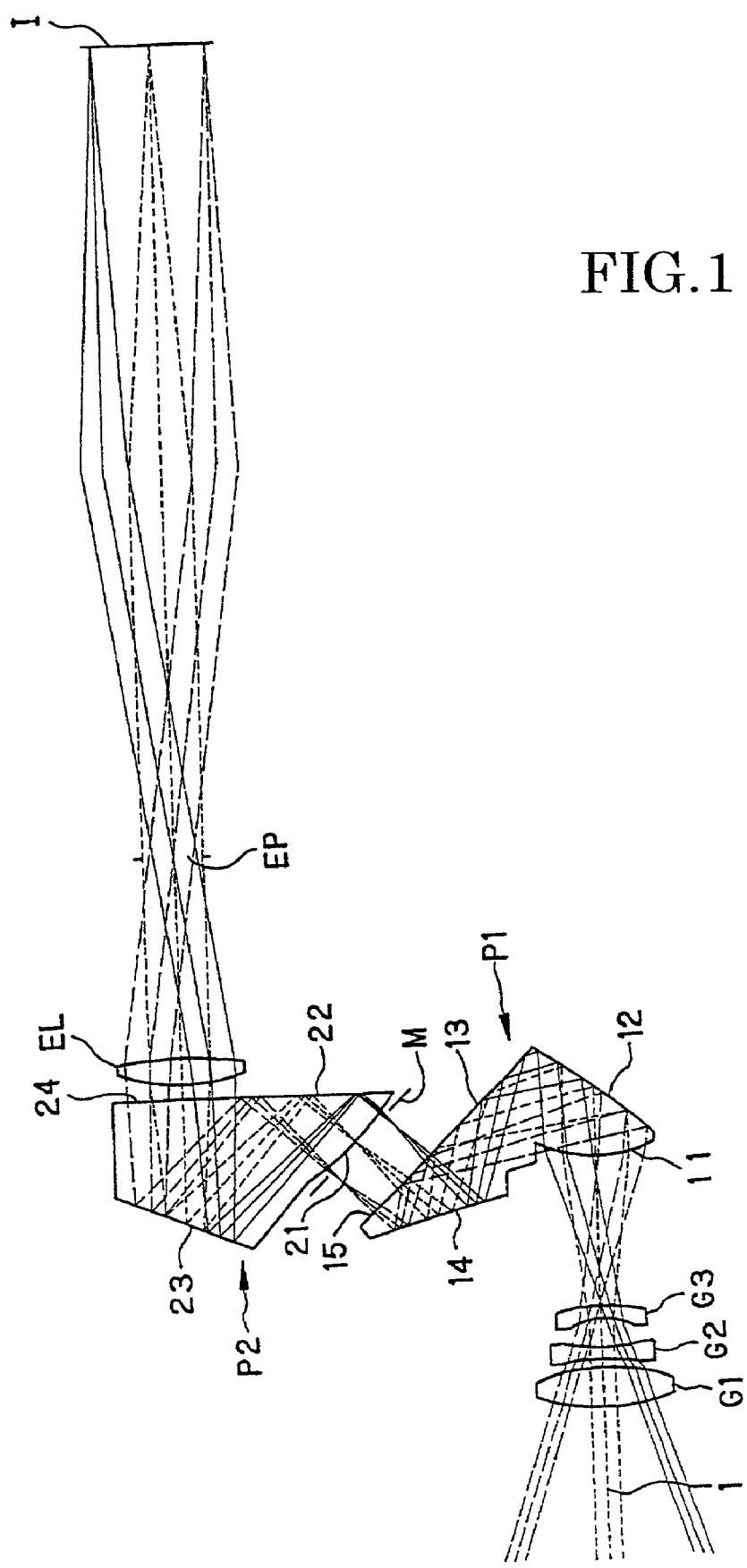
FIG. 1 is a sectional view of the first numerical example of this invention taken along the Y-Z plane at a wide angle end.

A first type of a real image mode variable magnification finder according to this invention comprises a variable magnification objective optical system having a positive optical power, an ocular optical system having a positive optical power, and a plurality of reflecting surfaces for erecting an image of an object to be observed. The objective optical system includes a plurality of movable lens units each of which has an aspherical surface, and at least one reflecting surface having an optical power (powered reflecting surface) and formed as a rotationally asymmetric surface. The finder satisfies the following condition:

$$0.02 < d(fw/ft^2) < 0.4 \qquad (1)$$

where d is a distance from the first surface of the objective optical system to one of the reflecting surface positioned nearest to an object to be observed measured along an axial chief ray at a wide angle end, fw is a focal length of the objective optical system at a wide angle end, and ft is a focal length of the objective optical system at a telephoto end.

Generally speaking, in a real image mode finder, the objective optical system should have a long back focal distance for arranging an image erecting system on a pupil side (exit side) thereof. This causes unnatural positioning of the principal points and makes it difficult to reduce the total length of the finder or to correct aberrations favorably. In addition, as the zooming ratio of the finder become large, the magnification power of each lens unit in the finder optical system becomes large and aberrations produced by each lens unit are magnified by the large magnification. Therefore, deterioration of aberrations due to decentering of the lens units and/or elements tends to become large. This makes it difficult to correct aberrations favorably or to adopt appropriate power arrangement suitable for obtaining high zooming ratio. As; is explained here, the constraint to keep back local distance long is very much disadvantageous to make zooming ratio high and constitutes an obstacle to miniaturizing the finder optical system.

According to this invention, the reflecting surface which contributes to erecting an image has an optical power and also functions as a part of the objective optical system in order to ease above described constraint of the long back focal distance.

In this case, when an optical power is simply given to a decentered reflecting surface, a rotationally asymmetric decentering aberration, that is, a rotationally asymmetric aberration caused by a decentered refractive or reflective optical surface, will be produced. Because this rotationally asymmetric decentering aberration is impossible to be corrected by a rotationally symmetric aspherical surface, at least one rotationally asymmetric surface should be introduced in the finder optical system. This enables correcting the decentering aberration favorably and the finder optical system will have an excellent imaging performance.

Improvement of the imaging performance is realized in this way. However, further consideration is necessary to miniaturize the finder optical system. That is, it is difficult to achieve both miniaturization and high imaging performance of the finder optical system unless the space of movement for the movable lens units, the distance from the first surface of the objective optical system to the entrance surface of the image erecting system and the distance from the entrance surface of the image erecting system to the first reflecting surface thereof are all miniaturized. Therefore, the following condition should be satisfied in consideration that the above distances depend on the focal length of the finder optical system at its telephoto end and the zooming ratio:

$$0.02 < d(fw/ft^2) < 0.4 \qquad (1)$$

where d is a distance from the first surface of the objective optical system to the first reflecting surface (reflecting surface positioned nearest to an object to be observed) measured along an axial chief ray at a wide angle end, fw is a focal length of the objective optical system at a wide angle end, and ft is a focal length of the objective optical system at a telephoto end.

In the case of using a rotationally asymmetric surface, it sometimes becomes difficult to define a focal length of an optical system in a conventional form. In this invention, the focal length f is defined by a limit value of $h/\alpha$ when h approaches zero. That is, assuming that a ray having a small height from an axial chief ray enters an optical system being parallel to the axial chief ray and exits therefrom at an intersecting angle $\alpha$ measured by radian from the axial chief ray, the focal length f of the optical system is given by the limit value of the quotient $h/\alpha$ when the h approaches zero.

In the above condition (1), when the upper limit 0.4 is exceeded, it becomes difficult to miniaturize the finder optical system. When the lower limit 0.02 is exceeded, the optical power of each lens unit becomes too strong to obtain a good imaging performance.

When the condition (1) is modified as below, a more favorable result will be obtained.

$$0.05 < d(fw/ft^2) < 0.25 \qquad (1\text{-}1)$$

Generally speaking, as a zooming ratio of a finder optical system become large, the magnification powers of the lens units in the objective optical system become large and aberrations produced by each lens unit are magnified by the large magnification power. This makes it difficult to correct aberrations favorably. Particularly, when an image erecting system is disposed on a pupil side (observer's pupil) and an optical power is given to a reflecting surface of the image erecting system, aberrations are further magnified by the reflecting surface. This makes it more difficult to correct aberrations favorably. To solve this problem, at least one aspherical surface should be provided in each lens units in the objective optical system for strictly correcting aberrations produced by each lens unit.

On the other hand, as an optical power of a lens element becomes stronger, curvature of the lens surface becomes larger and sag of the lens surface becomes large. Therefore, a positive lens element must have large center thickness to secure edge thickness to some extent and a negative lens element must have a large axial space between adjacent lens elements to avoid interference therewith. This makes it more difficult to miniaturize the finder when the magnification becomes large. To solve this problem, the at least one aspherical surface provided in each lens units should be a surface whose positive or negative optical power become gradually weak as a portion on the surface comes to periphery thereof.

Next, the influence on the zooming ratio resulting from reduction of thickness of the finder optical system will be explained.

To reduce the space of movement for the movable lens units, the thickness of each movable lens unit and the spaces between adjacent lens elements should be made small. However, there is limit to the reduction in the thickness of the lens units when considering manufacturability. So, it is desirable to make the spaces between adjacent lens units small. In an objective optical system having a small zooming ratio where amounts of movement of the movable lens units are small, the spaces between adjacent lens units are relatively small as compared to the entire length thereof. Therefore, it is not effective to make the space small for miniaturizing the objective optical system. On the contrary, in an objective optical system having a high zooming ratio, it is effective to make the space small for miniaturizing the objective optical system because it has relatively large spaces between adjacent lens units as compared to the entire length thereof. For above mentioned reason, it is desirable to satisfy the following condition:

$$2.5 \leq ft/fw \leq 10.0 \qquad (2)$$

where fw is a focal length of the objective optical system at a wide angle end and ft is a focal length of the objective optical system at a telephoto end.

When the upper limit 10.0 is exceeded, it becomes difficult to obtain good imaging performance. When the lower limit 2.5 is exceeded, the thickness of the objective optical system is not sufficiently reduced in spite of the large zooming ratio thereof.

When the condition (2) is modified as below, a more favorable result will be obtained.

$$3.0 \leq ft/fw \leq 7.0 \qquad (2\text{-}1)$$

When the zooming ratio is limited in a high range, the condition (1) is expandable. The set of conditions (1') and (2') also gives a favorable result:

$$0.02 < d(fw/ft^2) < 0.7 \quad (1')$$

$$3.5 \leq ft/fw \leq 10.0 \quad (2)$$

When the condition (1') and (2') are modified as below, a more favorable result will be obtained.

$$0.05 < d(fw/ft^2) < 0.5 \quad (1'\text{-}1)$$

$$4.0 \leq ft/fw \leq 7.0 \quad (2'\text{-}1)$$

A second type of a real image mode variable magnification finder according to this invention comprises a variable magnification objective optical system having a positive optical power, an ocular optical system having a positive optical power, and a plurality of reflecting surfaces for erecting an image of an object to be observed. The objective optical system comprises, in order from an object side, a front subsystem including a plurality of movable lens units and having a negative optical power, and a rear subsystem including at least one reflecting surface having a positive optical power and formed in a rotationally asymmetric shape.

This type of finder optical system is provided with a front subsystem having a negative optical power and a function varying magnification, and at least one reflecting surface on a pupil side of the front subsystem to bend the optical axis thereof. At least one of the reflecting surfaces has a positive optical power and constitutes a rear subsystem. To correct aberrations caused by the positive optical power and achieve both high zooming ratio and miniaturization of the optical system at the same time, at least one of the reflecting surfaces is formed in a rotationally asymmetric shape. These arrangements permit arranging a positive power on a pupil side in case of high zooming ratio and make the optical system small. Also, these arrangements permit arranging a rear subsystem in a way that does not render the thickness of the optical system large. This contributes to obtain high imaging performance.

In the objective optical system in this type of finder, an optical subsystem disposed on an object side of a first reflecting surface, which is positioned nearest to the object, is a front subsystem and an optical subsystem, which includes the first reflecting surface and other optical elements disposed on a pupil side of the first reflecting surface, is a rear subsystem. The first reflecting surface can be formed as a mirror, a reflecting prism or the like, and a plurality of reflecting surfaces or prisms may be used in the rear subsystem. The rear subsystem may include both a reflecting surface and a refracting optical element that has no reflecting surface.

The rear subsystem includes at least one positive powered reflecting surface but the entire optical power thereof is not necessarily positive because an optical power disposed near an intermediate image formed by the objective optical system has little effect to the magnification of the entire optical system.

A third type of a real image mode variable magnification finder according to this invention comprises a variable magnification objective optical system having a positive optical power, an ocular optical system having a positive optical power and a plurality of reflecting surfaces for erecting an image of an object to be observed. The objective optical system comprises, in order from an object side, a front subsystem including at least one fixed lens unit, a plurality of movable lens units and having a positive optical power, and a rear subsystem including at least one reflecting surface having a negative optical power and formed in a rotationally asymmetric shape. Each lens unit in the front subsystem includes at least one aspherical surface.

To attain high zooming ratio and miniaturization of an optical system, such an optical power arrangement is required that enables making the length of the optical system and the length of a light path small even when the focal length thereof becomes large. That is to say, a so-called telephoto type is acceptable as a basic structure and suitable power arrangement should be adopted based on the basic structure. However, further improvement is required to avoid the deficiencies described in the related art.

This type of finder optical system includes a front positive subsystem having a function varying magnification, and at least one reflecting surface on a pupil side of the front subsystem to bend the optical axis thereof. The at least one reflecting surface has a negative optical power and constitutes a rear subsystem. To correct aberrations caused by the negative optical power, at least one of the reflecting surfaces is formed in a rotationally asymmetric shape. To do this, the focal length of the front subsystem becomes small and the space for zooming can be easily made small. Also, by arranging a negative optical power on the reflecting surface for erecting an image, a negative power can be disposed on a pupil side of the objective optical system. This construction is effective for reduction of length of the optical system.

On the other hand, in case where two lens units is provided for zooming, the total thickness of the lens units becomes small and it is effective to reduce length of the optical system. However, this arrangement results in a strong power of the front subsystem, a strong curvature of the lens elements and large sag of the lens surfaces. Therefore, a positive lens element must have a large center thickness to secure the edge thickness to some extent and a negative lens element must have a large axial space between adjacent lens elements to avoid interference therewith. In addition to this, in the case where only two lens units are provided, the number of lens surfaces are too small to correct aberrations favorably even if aspherical surfaces are used when the zooming ratio becomes high.

In considering above, the objective optical system should have at least three lens units; in order to reduce sag of the lens surfaces (difference between the center and periphery of a lens surface in the direction of the optical axis) by dividing the optical power of the objective optical system into a plurality of lens surfaces and to improve the ability of correcting aberrations thereof.

Generally, when the zooming ratio becomes high, the magnification of each lens unit also becomes large and the optical system tends to be sensitive to decentering of the optical elements caused by manufacturing error. Moreover, in the zoom lens system, the lens barrel mechanism requires a mechanical tolerance for smoothly moving the movable lens units. This inevitably causes decentering of the movable optical element. Therefore, it is disadvantageous to increase the number of movable lens units for obtaining good imaging performance. In some case, slight image shift in the visual field come to be noticeable when the movable lens units move. Therefore, it is preferable to reduce the number of movable lens units and to provide fixed lens units.

In general, as the zooming ratio of a finder optical system become large, the magnification power of each lens unit in the finder optical system become large and aberrations produced by each lens unit are magnified by the large magnification power. This makes it difficult to correct aberrations favorably. Particularly, when an image erecting system is disposed on a pupil side and an optical power is given to a reflecting surface of the image erecting system, aberrations are further magnified by the reflecting surface. This makes it more difficult to correct aberrations favorably. To solve this problem, at least one aspherical surface should be provided in each lens unit in the objective optical system for strictly correcting aberrations produced by each lens unit.

In the objective optical system in this type of finder, an optical subsystem disposed on an object side of a first reflecting surface, which is positioned nearest to an object, is a front subsystem and an optical subsystem, which includes the first reflecting surface and other optical elements disposed on a pupil side of the first reflecting surface, is a rear subsystem. The first reflecting surface can be formed as a mirror, a reflecting prism or the like, and a plurality of reflecting surfaces or prisms may be used in the rear subsystem. The rear subsystem may include both a reflecting surface and a refracting optical element having no reflecting surface.

The rear subsystem includes at least one negative powered reflecting surface but the entire optical power thereof is not necessarily negative because an optical power disposed near the intermediate image formed by the objective optical system has little effect to the magnification of the entire optical system.

A fourth type of a real image mode variable magnification finder according to this invention comprises a variable magnification objective optical system having a positive optical power, an ocular optical system having a positive optical power and a plurality of reflecting surfaces for erecting an image of an object to be observed. The objective optical system comprises, in order from the object side, a plurality of movable lens units and a prism which has an entrance surface having a positive optical power, and a first reflecting surface formed as a rotationally asymmetric surface successive to the entrance surface and having a positive optical power.

A fifth type of a real image mode variable magnification finder according to this invention comprises a variable magnification objective optical system having a positive optical power, an ocular optical system having a positive optical power and a plurality of reflecting surfaces for erecting an image of an object to be observed. The objective optical system comprises, in order from an object side, a plurality of movable lens units and a prism which has an entrance surface having a negative optical power, and a first reflecting surface formed as a rotationally asymmetric surface successive to the entrance surface and having a negative optical power.

Here, the reason and operation for adopting these optical structures, especially the suitable power arrangement of a plurality of optical surfaces, are explained below.

As explained before, decentering aberrations caused by a decentered reflecting surface having an optical power can be corrected by forming the shape thereof as a rotationally asymmetric surface. However, when the optical power becomes too strong, forming the decentered reflecting surface in a rotationally asymmetric shape is not enough to correct decentering aberrations. For this reason, the power arrangement of the plurality of optical surfaces should be optimized to obtain a good imaging performance.

In addition to this, in order to accomplish both high zooming ratio and miniaturization of the optical system, a part of the function of the objective optical system should be performed by the image erecting system. Therefore, the optical power given to the reflecting surface should be disposed at a position where the lateral magnification thereof becomes large in some degree. In general, as an image erecting system is positioned relatively near the intermediate image in the finder optical system, the optical power should be assigned to the reflecting surface arranged relatively nearer to an object among the reflecting surfaces in the image erecting system. In the case where only the first reflecting surface disposed nearest to the object has an optical power, a problem with respect to correction of aberration will occur and it is difficult to achieve both high zooming ratio and miniaturization of the optical system.

Both mirrors and prisms are available for use in an image erecting system. As described above concerning the related art, a prism has an entrance surface and an exit surface each of which can share an optical power. So, in these types of finder optical system according to this invention, the image erecting system comprises a prism. The entrance and first reflecting surfaces which are positioned relatively nearer to the object in the finder optical system share optical powers having the same sign, that is, both positive or both negative. As the optical power is divided into a plurality of optical surfaces, the aberrations are well corrected even if the total optical power is strong. According to this arrangement, a part of function of the objective optical system can be shared by the image erecting system effectively and both miniaturization of the optical system and high zooming ratio are achieved.

A sixth type of a real image mode variable magnification finder according to this invention comprises a variable magnification objective optical system having a positive optical power, an ocular optical system having a positive optical power and a plurality of reflecting surfaces for erecting an image of an object to be observed. The objective optical system comprises a plurality of movable lens units and, in order from the object side, a negative reflecting surface, a negative reflecting surface and a positive reflecting surface. At least one of the three reflecting surfaces is a rotationally asymmetric surface.

A seventh type of a real image mode variable magnification finder according to this invention comprises a variable magnification objective optical system having a positive optical power, an ocular optical system having a positive optical power and a plurality of reflecting surfaces for erecting an image of an object to be observed. The objective optical system comprises a plurality of movable lens units and, in order from the object side, a positive reflecting surface, a positive reflecting surface and a negative reflecting surface. At least one of the three reflecting surfaces is a rotationally asymmetric surface.

Here, the reason and operation for adopting these optical structures, especially the suitable power arrangement when three reflecting surfaces are used in the image erecting system, are explained below.

In the fourth and fifth types of this finder optical system, the optical power is divided and shared by a reflecting surface and a refracting surface. An effect of the same kind is obtained by allocating the optical power to a plurality of reflecting surfaces. In view of correction of aberration, this is more advantageous because a reflecting surface produces no chromatic aberration even when it has an optical power.

However, when a plurality of reflecting surfaces having a strong optical power with only the same sign, correction of the Petzval sum becomes difficult and the image surface will incline. This can be corrected by providing optical surfaces having optical powers of opposite signs. However, an asymmetric image curvature is caused due to decentering of a reflecting surface and it is difficult to correct these kinds of image curvature by using a rotationally symmetric surface.

In the finder optical system according to this invention, two successive reflecting surfaces each having an optical power of the same sign and another reflecting surface having an optical power of the opposite sign disposed on a pupil side of the two reflecting surfaces are provided in the optical system, and at least one of these reflecting surfaces is formed as a rotationally asymmetric surface. That is, a positive, positive and negative, or a negative, negative and positive power arrangement is adopted in this order from an object side.

In this structure, a strong optical power shared by the image erecting system is allocated to a plurality of reflecting surfaces and both chromatic aberration and Petzval field curvature are corrected favorably. Besides, as the image erecting system effectively shares a part of objective optical system, both miniaturization of the optical system and high zooming ratio are accomplished.

A eighth type of a real image mode variable magnification finder according to this invention comprises a variable magnification objective optical system having a positive optical power, an ocular optical system having a positive optical power and a plurality of reflecting surfaces for erecting an image of an object to be observed. The objective optical system comprises at least three lens units and at least three reflecting surfaces at least one of which is a rotationally asymmetric surface.

To realize both miniaturization of the optical system and high zooming ratio, the objective optical system should include at least three lens units. Particularly for miniaturization, these three lens units should have no reflecting surfaces and be composed only of refractive optical elements such as lenses.

On the other hand, the real image mode finder used for a compact size camera such as so-called lens-shutter cameras must meet two requirements. One is that the optical axis entering the objective optical system is parallel or substantially parallel to the optical axis exiting from the ocular optical system. A camera which does not satisfy this requirement is very poor in usability because the direction of peering through the ocular and the direction of the object to be observed are different from each other. Second is to erect an image of an object to be observed by suitably arranging a plurality of reflecting surfaces. A camera which does not satisfy this requirement is also very poor in usability because the user must compose a picture based on an inverted image. Therefore, all finder optical system must satisfy these two requirements.

However, when a reflecting surface has an optical power, the decentering aberration become great as the reflection angle become great. When the number of reflecting surfaces used in the finder optical system is too small, the reflection angle on the reflecting surfaces tends to become large in order to meet the above requirements and it is disadvantageous to obtain a good imaging performance. On the other hand, when the number of reflecting surfaces increases, loss of light will occur by reflection and the image to be observed will become dark.

In this type of finder optical system, three reflecting surfaces are provided on the object side of an intermediate image position and at least one of these is formed as a rotationally asymmetric surface. This construction realizes a small reflection angle and therefore, makes it possible to obtain good imaging performance and less loss of light.

A ninth type of a real image mode variable magnification finder according to this invention comprises a variable magnification objective optical system having a positive optical power, an ocular optical system having a positive optical power and a plurality of reflecting surfaces for erecting an image of an object to be observed. The objective optical system comprises at least three lens units aligned on a common optical axis, two reflecting surfaces, at least one of which is a rotationally asymmetric surface, and a prism having an entrance surface and an exit surface, at least one of which is a rotationally asymmetric surface.

In this type of finder, the number of reflecting surfaces used in the optical system is not so large and decentering aberrations are corrected by other surfaces. Specifically, two reflecting surfaces are provided on an object side of an intermediate image position at least one of which is formed as a rotationally asymmetric surface and at least either the entrance surface or the exit surface of the prism is also formed as a rotationally asymmetric surface. In this structure, even when a reflection angle become large, decentering aberrations can be corrected by a rotationally asymmetric surface provided on the refracting surface of the prism and good imaging performance will be obtained.

On a prism of an image erecting system disposed on the object side of an intermediate image position, the height of an axial ray is higher at the entrance surface than at the exit surface. Therefore, it is preferable to provide a rotationally asymmetric surface on the entrance surface of the prism to effectively correct the aberrations.

On the other hand, when the ocular optical system is composed only of rotationally symmetric optical elements, the pupil of the objective optical system should be rotationally symmetric to obtain a rotationally symmetric exit pupil of the finder. Since the diameter of an axial light flux is smaller on the exit surface than on the entrance surface, it is preferable to provide a rotationally asymmetric surface on the exit surface of the prism to effectively correct the asymmetry of the pupil without affecting other aberrations.

In the above mentioned second through seventh type of finder optical systems, if the optical power of the reflecting surface is different in the X and Y directions, that is, in two orthogonal directions in a plane perpendicular to the axial chief ray, the finder optical system is within the scope of this invention when the optical power in at least one of the two directions meets the above described condition, explanation or requirement.

The finder optical system according to this invention may include a rotationally symmetric reflecting surface. This construction is advantageous for manufacturing since the rotationally symmetric surface can be used as a reference surface to measure the surface profile.

In the finder optical system according to this invention, it is undesirable to form all reflecting surfaces as rotationally asymmetric surfaces.

In the above first, second and fourth through seventh types of finder optical system, the objective optical system preferably comprises at least three lens units other than above mentioned reflecting surfaces.

In the above first, second and fourth through seventh types of finder optical system, as mentioned with respect to the third type, the objective optical system preferably comprises at least three lens units to achieve miniaturization and high zooming ratio.

In the case where the above objective optical system is adopted in the first, second and fourth through seventh types, or in the eighth or ninth type, the objective optical system includes preferably at least one fixed lens unit. This will reduce degradation of imaging performance caused by manufacturing error.

In the first through ninth type of the finder optical system, the movable lens units in the objective optical system preferably are refracting optical systems with no reflecting surfaces.

Here, the variable magnification optical system which is composed only of a refracting optical component or includes a reflecting optical component will be explained respectively.

Figure 22:
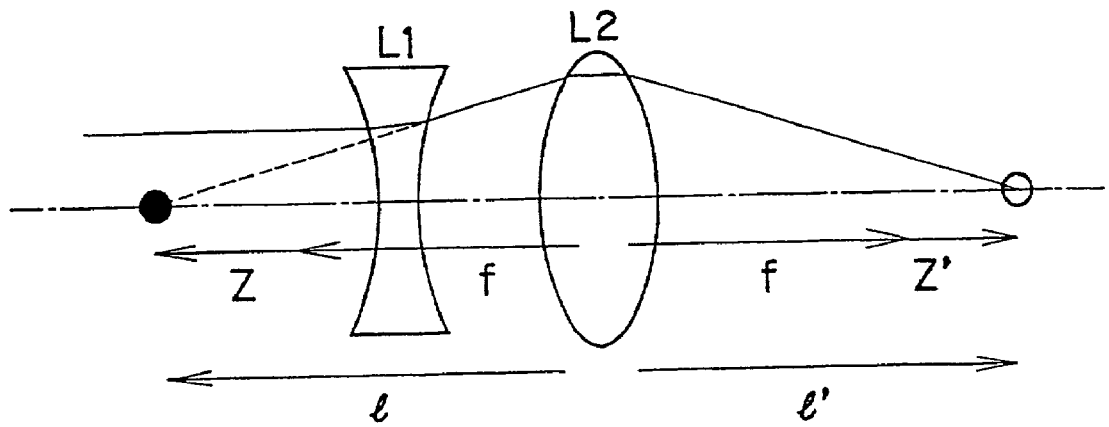
FIG. 22 is a schematic view of a variable magnification optical system composed of a negative and a positive optical components both of which are refractive optical components.

FIG. 22 shows an example of a variable magnification optical system constructed with a negative first lens L1 and a positive second lens L2. In this optical system, the negative first lens L1 forms a virtual image of an object at a position indicated by a black dot and the positive second lens L2 forms a real image of the virtual image as a virtual object at a position indicated by a white dot. The lateral magnification power m of the positive second lens L2 is given by m=−I′/I in paraxial or Gaussian optics and is relatively large (approximately −1) in the example of FIG. 22. By moving the second lens L2, therefore, a large magnification change will be obtained. However, when the virtual image formed by the first lens L1 is far from the second lens L2, the magnification power possessed by the second lens L2 is small and the magnification change obtained by moving the second lens is also small. An optical element or unit having a large lateral magnification power is necessary in variable magnification optical system in order to change the magnification power effectively.

Figure 23:
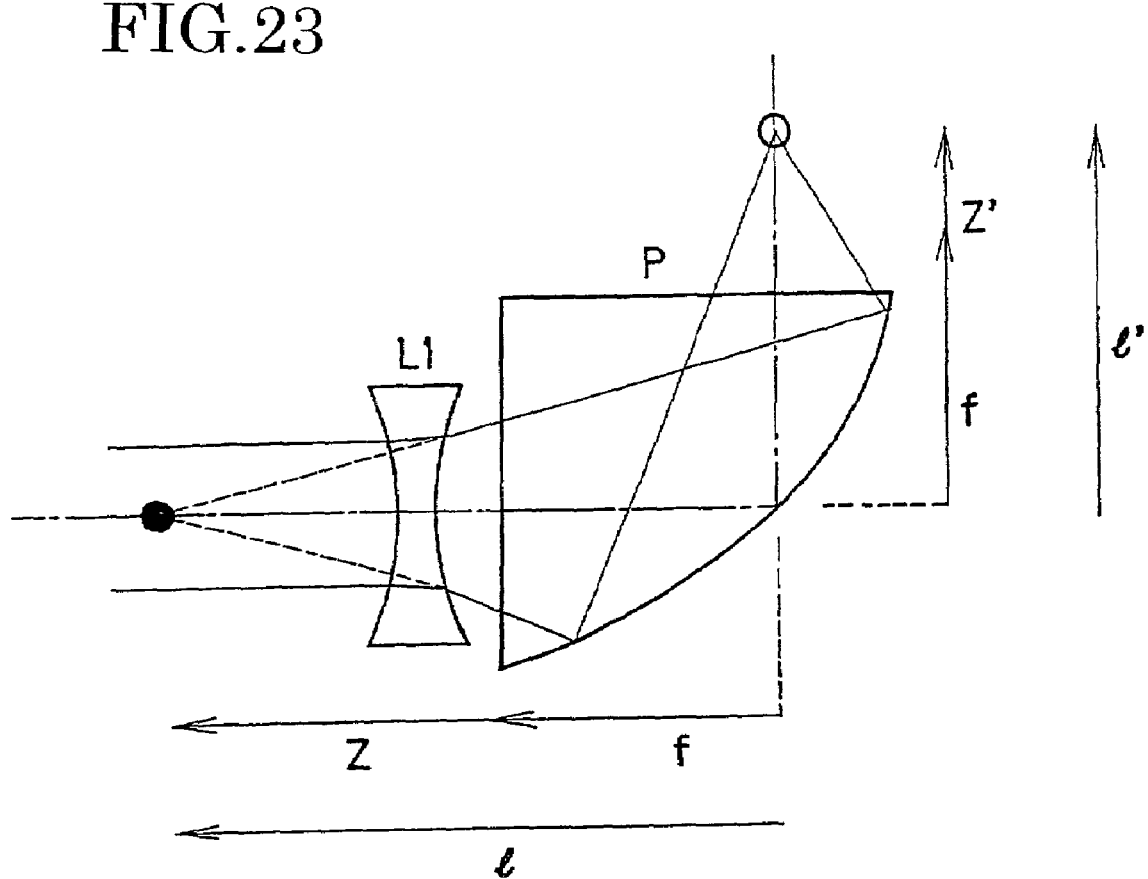
FIG. 23 is a schematic view of a variable magnification optical system composed of a negative and a positive optical components either of which is a refractive optical component.

FIG. 23 shows an example of a variable magnification optical system constructed by a negative first lens L1 and a positive second reflecting prism P. It corresponds to an optical system substituting a prism P for the second lens L2. In this optical system, the reflecting surface is distant from the entrance surface of the prism deep inside the prism. Therefore, it is impossible to bring the reflecting surface close to the virtual image formed by the first lens L1 and to make the magnification power of the prism large. So only small magnification change will be obtained when the prism P is moved.

As is apparent from foregoing, it is preferable to select a refracting optical unit having no reflecting surfaces as a movable optical unit for changing magnification power. Moreover, as can be seen from FIG. 23, when the effective area of the reflecting surface is arranged so as not to overlap the effective areas of the entrance surface and the exit surface, the distance between the reflecting surface and the exit surface or the entrance surface becomes large. This means that a reflecting optical system tends to be larger than a refracting optical system. To make the optical system small, it is preferable to use a refracting optical element.

In the above first, second, fourth and seventh through ninth types of finder optical system, as mentioned with respect to the third type, both miniaturization and high zooming ratio are achieved by providing a negative subsystem. Also, good imaging performance is obtained by providing at least three lens units in the negative subsystem.

In this case, suitable power allocation among these three lens units results in an excellent imaging performance. As the total optical power of these three lens units are negative, it is preferable to increase the number of negative lens units for dividing the negative optical power and correcting aberrations, and also preferable to provide a positive lens unit to correct residual aberrations with the converging function thereof. For this purpose, the negative subsystem is composed of at least two negative lens units and a positive lens unit. This realizes a good balance of aberrations.

This negative subsystem is preferably disposed on the object side of a reflecting surface for miniaturization as mentioned concerning to the second type. Besides, this negative subsystem is preferably composed only of refracting lens units with no reflecting surface therein for miniaturization.

The negative subsystem preferably satisfies the following condition:

$$0.02 < fw/fneg < 0.9 \tag{3}$$

where fw is the focal length of the objective optical system at a wide angle end and fneg is an absolute value of a focal length of the negative subsystem.

When the lower limit of 0.02 is violated, the negative power becomes too weak to make the optical system small. When the upper limit of 0.9 is violated, the negative power becomes too strong to obtain good imaging performance.

When condition (3) is modified as below, a more favorable result will be obtained.

$$0.05 < fw/fneg < 0.7 \tag{3-1}$$

Further, for suitable power allocation, it is desirable that the following condition is satisfied:

$$0.2 < |fN/fP| < 1.7 \tag{4}$$

where fP is the focal length of the lens unit having the strongest positive power in the negative subsystem and fN is the focal length of the lens unit having the strongest negative power in the negative subsystem.

When the upper limit of 1.7 is exceeded, the negative power of the negative subsystem becomes too weak to miniaturize the optical system, or the positive power of the positive lens unit becomes too strong to obtain good imaging performance. When the lower limit of 0.2 is exceeded, the negative power of the negative subsystem becomes too strong to obtain good imaging performance, or the positive power of the positive lens unit becomes too weak to correct aberrations by utilizing the converging function thereof, for example, to correct distortion favorably.

When the condition (4) is modified as below, a more favorable result will be obtained.

$$0.35 < |fN/fP| < 1.2 \tag{4-1}$$

In the above first, third, fifth, sixth, eighth and ninth types of finder optical system, the objective optical system preferably comprises a positive subsystem including at least two positive lens units and a negative lens unit. In these types, as mentioned with respect to the third type, both miniaturization and high zooming ratio are achieved by providing a positive subsystem. Also, good imaging performance is obtained by providing at least three lens units in the positive subsystem.

In this case, suitable power allocation among these three lens units results in an excellent imaging performance. As the total optical power of these three lens units is positive, it is preferable to increase the number of positive lens units for dividing the positive optical power and correcting aberrations, and also preferable to provide a negative lens unit to correct residual aberrations by the diverging function thereof. For this purpose, the positive subsystem is composed of at least two positive lens units and a negative lens unit. This obtains a good balance of aberrations.

This positive subsystem is preferably disposed on the object side of a reflecting surface constructing an image erecting system for miniaturization as mentioned concerning to the third type. Besides, this positive subsystem is preferably composed only of refracting lens units with no reflecting surface therein for miniaturization.

The positive subsystem preferably satisfies the following condition:

$$0.7 < fw/fpos < 3.0 \quad (5)$$

where fw is the focal length of the objective optical system at the wide angle end and fpos is the focal length of the positive subsystem.

When the lower limit of 0.7 is violated, the positive power becomes too weak to make the optical system small. When the upper limit of 3.0 is violated, the positive power becomes too strong to obtain good imaging performance.

When the condition (5) is modified as below, a more favorable result will be obtained.

$$1.0 < fw/fpos < 2.5 \quad (5\text{-}1)$$

When the condition (5) is modified as below, a still further favorable result will be obtained.

$$1.6 < fw/fpos < 2.1 \quad (5\text{-}2)$$

Further, for suitable power allocation, it is desirable the following condition be satisfied:

$$0.8 < |fP/fN| < 2.5 \quad (6)$$

where fP is the focal length of the lens unit having the strongest positive power in the positive subsystem and fN is the focal length of the lens unit having the strongest negative power in the positive subsystem.

When the upper limit of 2.5 is exceeded, the positive power of the positive subsystem becomes too weak to miniaturize the optical system, or the negative power of the negative lens unit becomes too strong to obtain good imaging performance. When the lower limit of 0.8 is exceeded, the positive power of the positive subsystem becomes too strong to obtain good imaging performance, or the negative power of the negative lens unit becomes too weak to correct aberrations by utilizing the diverging function thereof, for example, to correct distortion favorably.

When the condition (6) is modified as below, a more favorable result will be obtained.

$$1.1 < |fP/fN| < 2.0 \quad (6\text{-}1)$$

When the condition (6) is modified as below, a still further favorable result will be obtained.

$$1.35 < |fP/fN| < 1.8 \quad (6\text{-}2)$$

In the positive subsystem, at least one lens unit is preferably fixed during a zooming operation. As mentioned concerning the third type, it is desirable, for reducing degradation of imaging performance caused by manufacturing error, that the objective optical system includes at least one fixed lens unit during zooming operation.

In the first through ninth types of finder optical system, the objective optical system preferably comprises, in order from the object side, a negative first lens unit, a positive second lens unit and a positive third lens unit, in which at least the first lens unit is fixed lens unit.

As mentioned before, the objective optical system should have a long back focal distance in order to arrange an image erecting system. In this invention, an optical power is assigned to a reflecting surface forming an image erecting system in order to moderate the restriction of maintaining a long back focal distance. However, there still needs to keep a room to place an image erecting system after the objective optical system. So an optical system disposed on the object side of the reflecting surface is still preferably an optical system suitable for maintaining a long back focal distance.

When a positive optical system is placed on the object side of a reflecting surface for erecting an image, a so-called inverted telephoto type power arrangement, which has a negative-positive power in this order from an object side, is suitable for shifting the principal point to the side of intermediate image position and keeping a long back focal distance. In terms of obtaining good imaging performance, this optical system preferably includes at least three lens units.

Here, the objective optical system is composed of at least a negative first lens unit, a positive second lens unit and a positive third lens unit. This structure corresponds to an inverted telephoto type in which the positive power is divided into two lens units and therefore, is suitable for keeping a long back focal distance and reducing aberrations.

In the first through ninth types of finder optical system, the objective optical system preferably comprises, in order from the object side, a positive first lens unit, a negative second lens unit and a negative third lens unit.

When a negative optical system is disposed on the object side of a reflecting surface for erecting an image, a positive optical system is necessary in the objective optical system because the total power thereof must be positive.

In the case where an reflecting surface in an image erecting system has a positive power, if a virtual image formed by the negative optical system is not so positioned that the magnification power of the positive power becomes large, it is very disadvantageous for miniaturization of the optical system. That is, the principal point of the negative optical system should be shifted toward the intermediate image position to make the distance between the virtual image and a principal point of the positive optical system small.

In the case where the negative optical system is composed of a negative unit and a positive unit in this order, the principal point of the negative optical system can be shifted toward the intermediate image position. In terms of obtaining good imaging performance, this optical system preferably includes at least three lens units.

Based on above consideration, the objective optical system is composed of, in order from the object side, at least a positive first lens unit, a negative second lens unit and a negative third lens unit. To do this, the negative power is divided into two lens units and therefore, both miniaturization and good imaging performance are achieved.

In the first through ninth types of finder optical system, the objective optical system preferably comprises, in order from the object side, a negative first lens unit, a positive second lens unit and a negative third lens unit.

When analyzing a system composed of three lenses based on a theory of aberration, it becomes clear that an optimized power arrangement is very limited. One is a positive-negative-positive type that is famous in a fixed focal length lens system, and the other is a negative-positive-negative type. When the first lens unit is positive, its diameter becomes large and in some cases, it is disadvantageous for miniaturization.

Here the objective optical system is composed of, in order from an object side, a negative first lens unit, a positive second lens unit and a negative third lens unit. By this structure, an objective optical system having favorable correction of aberrations and good performance can be obtained.

In this case, the first lens unit is preferably a fixed lens unit during zooming operation to reduce degradation of imaging performance caused by manufacturing error. And the composite focal length of the first through third lens units is preferably negative.

In the first, second, fourth and seventh through ninth types of finder optical system, the part of image erecting optical system disposed on the object side of the intermediate image preferably includes at least one reflecting surface having a positive power and satisfying the following condition:

$$0.015<|2n\cdot\tan\theta\cdot Ih/r|<1.5 \tag{7}$$

where r is a radius of curvature of the reflecting surface at a point where the axial chief ray passes, n is a refractive index at a wavelength of the d-line, of the medium arranged on the entrance and exit sides of the reflecting surface, θ is a reflecting angle, and Ih is a half length of the diagonal line of the field mask positioned on or in the vicinity of the intermediate image surface.

When too strong optical power is provided to the reflecting surface, the decenterling aberration is difficult to correct even if a rotationally asymmetric surface is used. Therefore, in the first, second, fourth and seventh through ninth types of finder optical system, at least one reflecting surface having a positive power preferably satisfies the condition (7).

Because the power of the reflecting surface when it is not decentered is given by 2n/r, the parameter defined in condition (7) means the power of the reflecting surface including the effect of reflection angle 2n·tan θ/r normalized by Ih. When the upper limit of 1.5 is violated, the power of the reflecting surface is too weak to achieve miniaturization. When the lower limit of 0.015 is violated, the power of the reflecting surface is too strong to correct decentering aberrations.

If the optical power of the reflecting surface at a point where the axial chief ray passes is different in X and Y directions, that is, in two orthogonal directions in a plane perpendicular to the axial chief ray, the finder optical system is in the scope of this invention when the optical power in at least one of the two direction meets the above described condition.

When the condition (7) is modified as below, a more favorable result will be obtained.

$$0.05<|2n\cdot\tan\theta\cdot Ih/r|<0.8 \tag{7-1}$$

In the first, third, fifth, sixth, eighth and ninth types of finder optical system, the part of image erecting optical system disposed on the object side of the intermediate image position preferably includes at least one reflecting surface having a negative power and satisfying the following condition:

$$0.015<|2n\cdot\tan\theta\cdot Ih/r|<1.5 \tag{8}$$

where r is a radius of curvature of the reflecting surface at a point where the axial chief ray passes, n is a refractive index at a wavelength of the d-line, of the medium arranged on the entrance and exit sides of the reflecting surface, θ is a reflecting angle, and Ih is a half length of the diagonal line of the field mask positioned on or in the vicinity of the intermediate image surface.

When the upper limit of 1.5 is violated, the power of the reflecting surface is too weak to achieve miniaturization. When the lower limit of 0.015 is violated, the power of the reflecting surface is too strong to correct decentering aberrations.

If the optical power of the reflecting surface at a point where the axial chief ray passes is different in the X and Y directions, that is, in two orthogonal directions in a plane perpendicular to the axial chief ray, the finder optical system is within the scope of this invention when the optical power in at least one of the two direction meets the above described condition.

When the condition (8) is modified as below, a more favorable result will be obtained.

$$0.05<|2n\cdot\tan\theta\cdot Ih/r|<0.8 \tag{8-1}$$

In the first through ninth types of finder optical system, the part of the image erecting optical system disposed on the object side of the intermediate image surface preferably includes at least one positive reflecting surface and at least one negative reflecting surface. These reflecting surfaces both preferably satisfy the following condition:

$$0.015<|2n\cdot\tan\theta\cdot Ih/r|<1.5 \tag{9}$$

where r is a radius of curvature of the reflecting surface at a point where the axial chief ray passes, n is a refractive index at a wavelength of the d-line, of the medium arranged on the entrance and exit sides of the reflecting surface, θ is a reflecting angle, and Ih is a half length of the diagonal line of the field mask positioned on or in the vicinity of the intermediate image surface.

As mentioned concerning to the sixth and seventh type, when a plurality of reflecting surfaces have optical powers of only same sign, correction of the Petzval sum becomes difficult and the image surface will incline. In some case, it comes to be difficult to keep aberrations in good balance when only a converging function or a diverging function is provided in the optical system and residual aberrations will remain. Further, when the reflecting surface has an optical power, the principal point tends to be positioned deep inside the optical system as explained before.

Therefore, the part of image erecting optical system disposed on the object side of the intermediate image surface preferably includes at least one positive reflecting surface and at least one negative reflecting surface. To do this, the Petzval sum is easily corrected and other aberrations are also easily corrected by canceling the converging and diverging functions with each other. Moreover, the position of the principal point is easily adjusted and optical system is optimized.

When the upper limit of 1.5 is violated, the power of the reflecting surface is too weak to achieve miniaturization. When the lower limit of 0.015 is violated, the power of the reflecting surface is too strong to correct decentering aberrations.

If the optical power of the reflecting surface at a point where the axial chief ray passes is different in X and Y directions, that is, in two orthogonal directions in a plane perpendicular to the axial chief ray, the finder optical system is in the scope of this invention when the optical power in at least one of the two direction meets the above described condition.

When the condition (9) is modified as below, a more favorable result will be obtained.

$$0.05<|2n\cdot\tan\theta\cdot Ih/r|<0.8 \tag{9-1}$$

In the first through ninth types of finder optical system, the number of reflecting surfaces disposed on the object side of the intermediate image surface is preferably two or three.

In many case, only one reflecting surface having optical power is not enough to correct aberrations sufficiently. Whereas more than four reflecting surfaces occupy much space, it is hard to miniaturize the optical system. Two or three reflecting surfaces make it possible to balance the imaging performance and size of the optical system.

In the first through ninth types of finder optical system, at least one of the reflecting surfaces is preferably composed of a totally reflecting surface.

When a reflecting surface is coated by metal such as Al, Au or the like, the reflectance is less than 100% and merely about 85%. However, at least four reflecting surfaces are necessary in the image erecting system to erect the image. This results in a reflectance of about 52% and the image will be darkened. On the contrary, a totally reflecting surface has a reflectance of 100%. Therefore, when at least one totally reflecting surface is used in the image erecting system, loss of light decreases and a bright image can be obtained.

In the first through ninth types of finder optical system, at least one of the reflecting surfaces preferably satisfies the following condition:

$$5° < \theta < 60° \quad (10)$$

where $\theta$ is a reflection angle of the axial chief ray.

As mentioned concerning to the eighth type, when the reflecting surface has an optical power, the decentering aberrations become large as the reflection angle becomes large. On the other hand, when the reflection angle becomes too small, the effective area of the reflecting surface comes to overlap with the effective area of other optical surfaces and it becomes difficult to construct a practical optical system. To avoid this, at least one reflecting surface preferably satisfies the condition (10).

When the upper limit of 60° is exceeded, decentering aberration will increase even if a rotationally asymmetric surface is used on the powered reflecting surface. When the lower limit of 5° is exceeded, the effective area of the reflecting surface tends to overlap with the effective area of other optical surfaces.

When the condition (10) is modified as below, a more favorable result will be obtained.

$$15° < \theta < 45° \quad (10\text{-}1)$$

When the condition (10) is modified as below, a still further favorable result will be obtained.

$$25° < \theta < 40° \quad (10\text{-}2)$$

In the first through ninth types of finder optical system, the part of image erecting optical system disposed on the object side of the intermediate image surface is preferably composed of a prism whose entrance surface is a rotationally asymmetric surface. This structure makes it possible to correct decentering aberrations effectively as is explained about the ninth type.

In the first through ninth types of finder optical system, the part of image erecting optical system disposed on the object side of the intermediate image surface is preferably composed of a prism whose exit surface is a rotationally asymmetric surface. This structure makes it possible to correct asymmetricity of the exit pupil as is explained about the ninth type.

In the first through ninth types of finder optical system, the part of image erecting optical system disposed on the object side of the intermediate image surface is preferably fixed during zooming operation.

Usually, a reflecting element having an optical power is larger than a refracting element as mentioned before. Therefore, when the reflecting element moves for zooming, a large load will be applied to the driving mechanism for zooming.

On the other hand, in the zoom lens system, the lens barrel mechanism requires a mechanical tolerance for smoothly moving the movable lens units. This inevitably causes decentering of the movable optical elements. This is particularly disadvantageous to the optical system having a powered reflecting surface because a reflecting surface is more sensitive to error than a refracting surface. Therefore, the part of the image erecting optical system disposed on the object side of the intermediate image surface is preferably fixed during zooming operation.

In the first through ninth types of finder optical system, the image erecting optical system may comprise a roof shaped reflecting surface for reflecting light ray six times for erecting an image.

When the number of reflecting surfaces is too many, loss of light produced by reflection will be large. Whereas, when the number of reflecting surfaces used in the finder optical system is too small, the two requirements explained in the eighth type will be difficult to be satisfied.

On the other hand, the roof shaped reflecting surface reflects light two times but occupies almost the same space as one reflecting surface, and therefore is suitable for miniaturization of the optical system.

Here, the total number of reflections for erecting the image is made six and two of them are done by a roof shaped surface. This structure contributes to both miniaturization and high imaging performance.

In the first through ninth types of finder optical system, the image erecting optical system may be composed of a Porro-prism which reflects light four times. This structure contributes to both miniaturization and high imaging performance.

In the first through ninth types of finder optical system, it is desirable that an exit pupil of the objective optical system is rotationally symmetrically corrected.

In the real image type finder optical system, the intermediate image formed in the air by the objective optical system is observed through the ocular optical system. To lead the intermediate image into the ocular optical system, the position of the exit pupil of the objective optical system and that of the entrance pupil of the ocular optical system must fully coincide with each other for coupling the pupils. This situation is completely different from that in a single lens reflex camera in which an image formed on a diffusion plates (focussing screen) is observed through an ocular optical system, or an optical instrument in which an image displayed on a display device composed of LEDs etc. is observed through an ocular optical system. In these kinds of optical instruments, it is not an image in the air that is observed through an ocular optical system and therefore, the above described coincidence of the pupils need not always be satisfied.

In this invention, an image formed in the air is observed through an ocular optical system and therefore, relationship between the exit pupil of the objective optical system and the entrance pupil of the ocular optical system must be carefully considered.

When the ocular optical system is constructed only of a rotationally symmetric optical components, the residual asymmetricity of the position of the exit pupil of the objective optical system will obstruct interconnection of the pupils of the objective optical system and the ocular optical system. This means that an eclipse will occur and a part of image comes not to be observed.

Therefore, the position of the exit pupil of the objective optical system should be corrected symmetrically.

In the first through ninth types of finder optical system, the axial chief rays entering to the objective optical system and exiting from the ocular optical system should be parallel or substantially parallel with each other.

More specifically, the angle φ between the axial chief rays entering to the objective optical system and exiting from the ocular optical or their extension lines preferably satisfy the following condition:

$$0°\leq \phi <20° \quad (11)$$

Other than with a waist level finder, in the real image mode finder optical system, the light entering direction and light exit direction to and from the finder optical system should be parallel as mentioned concerning the eighth type. As a matter of course, in a lens shutter camera or the like, the light entering direction to the objective optical system of the finder is slightly inclined in some cases in order to eliminate the parallax between the picture taking optical system and the finder optical system. In this case, the light entering direction and light exiting direction to and from the finder will deviate slightly from parallelism.

When the upper limit of 20° is exceeded, the parallax between the objective optical system and an ocular optical system becomes too much. The lower limit of 0° means parallel.

When the condition (10) is modified as below, a more favorable result will be obtained.

$$0°\leq \phi <10° \quad (11\text{-}1)$$

In the first through ninth types of finder optical system, the angle α between the axial chief rays entering to the objective optical system and entering to the intermediate image surface or their extension lines preferably satisfy the following condition:

$$15°<\alpha <75° \text{ or } 105°<\alpha \leq 180° \quad (12)$$

When the axial chief rays entering the objective optical system and entering the intermediate image surface are parallel with each other and the direction thereof is the same, the thickness of the finder (length in the direction of camera depth) becomes large because an ocular optical system is disposed in tandem with the objective optical system. On the other hand, when the axial chief ray entering the intermediate image surface is perpendicular to that entering to the objective optical system, the height of the finder (length in the direction of camera height) becomes large.

To miniaturize the finder, the direction of the axial chief ray entering the intermediate image surface should be so established that it is inclined to or is opposite to the axial chief ray entering the objective optical system and the dimension of the finder in the directions of depth and height should be appropriately balanced. This is the reason to set the condition (12), where, α is a smaller angle of the two intersection angles between the axial chief rays entering the objective optical system and entering the intermediate image surface or their extension lines. Therefore, the angle α is within the range of 0° through 180° (0° means parallel and in the same direction, 180° means parallel and in the opposite direction).

When the upper limits are exceeded, the finder will become too large in height. When the lower limits are exceeded, the finder will become too large in thickness.

When the condition (10) is modified as below, a more favorable result will be obtained.

$$30°<\alpha <60° \text{ or } 120°<\alpha \leq 180° \quad (12\text{-}1)$$

In the first through ninth types of finder optical system, it is preferable to form only one intermediate image and to use no relay optical system for erecting image. In the first through ninth types of finder optical system, a part of the image erecting optical system disposed on the object side of the intermediate image surface preferably includes at least two rotationally asymmetric surfaces.

A rotationally asymmetric surface is effective for correcting decentering aberrations. However, as the optical power thereof becomes stronger, the decentering aberrations produced therefrom becomes large. In the case where only one rotationally asymmetric surface is provided in the optical system, it becomes difficult to correct the decentering aberrations favorably when the optical power of the rotationally asymmetric surface is strong. By providing at least two rotationally asymmetric surfaces, residual decentering aberration that is not fully corrected by only one rotationally asymmetric surface can be corrected favorably by another rotationally asymmetric surface. This structure allows the rotationally asymmetric surfaces to have a strong optical power. This is the reason to provide at least two rotationally asymmetric surfaces.

These rotationally asymmetric surfaces may be reflecting surfaces and/or refracting surfaces.

The second through ninth types of finder optical system preferably satisfy the above described condition (1'):

$$0.02<d(fw/ft^2)<0.7 \quad (1')$$

The definition of focal length is given by the limit value of the quotient h/α similar to the first type.

When the upper limit 0.7 is exceeded, it comes to be difficult to miniaturize the finder optical system. When the lower limit 0.02 is exceeded, the optical power of each lens unit becomes too strong to obtain a good imaging performance.

When the condition (1') is modified as below, a more favorable result will be obtained.

$$0.02<d(fw/ft^2)<0.4 \quad (1'\text{-}1)$$

When the condition (1') is modified as below, a still further favorable result will be obtained.

$$0.05<d(fw/ft^2)<0.25 \quad (1'\text{-}2)$$

The second through ninth types of finder optical system preferably satisfy the above described condition (2):

$$2.5\leq ft/fw \leq 10.0 \quad (2)$$

The reason that the condition (2) should be satisfied by these types of finder optical system is almost the same as that of the first type.

When the condition (2) is modified as below, a more favorable result will be obtained.

$$3.0\leq ft/fw \leq 10.0 \quad (2\text{-}2)$$

When the condition (2) is modified as below, a still further favorable result will be obtained.

$$3.5\leq ft/fw \leq 7.0 \quad (2\text{-}3)$$

The above described finder optical system comprises a reflecting surface in an image formation optical path and the optical path is folded. Here, features of folded optical path are explained from the view point of miniaturization and high zooming ratio.

In the real image mode finder optical system according to this invention, the objective optical system comprises a plurality of movable lens units and a prism having a reflecting surface for erecting an image. This prism has, in order from an object toward down stream along the light traveling direction, an entrance surface, a first reflecting surface, a second reflecting surface, a third reflecting surface and an exit surface.

When folding a light path with a plurality of reflecting surfaces, the chief ray is not always reflected in a two dimensional plane but sometimes travels in a three dimensional space. Here, explanation will be given only for a two dimensional light path, but this is also applicable for a three dimensional light path. Let the axial chief ray, that is, the optical axis of the objective optical system act as a reference light ray, and the plane including three intersecting points of each of an entrance surface, the first reflecting surface, a second reflecting surface and axial chief ray, as a reference plane. When the chief ray is always in the reference plane, the theory is directly applicable. On the other hand, when the chief ray comes out of the reference plane, the theory is still applicable for the projection of the chief ray onto the reference plane.

From this standpoint, all arrangement of reflecting surfaces providing the two and/or three dimensional light paths to which this theory is applicable, are regarded as equivalent and within the scope of same inventive concept.

In this invention, the first and second reflecting surfaces are so configured that the chief ray or projection thereof onto the reference plane is deflected in the same angular directions relative to the light traveling direction on the first and second reflecting surfaces. Whereas, the third reflecting surface is so configured that the chief ray or projection thereof onto the reference plane is deflected in the opposite angular direction to that by the first and second reflecting surfaces, relative to the light traveling direction.

In above structure, the first and second reflecting surfaces contribute to the function of erecting the image and to miniaturization of finder thickness by folding the optical path. The third reflecting surface guides the light path to a direction away from the objective optical system and contributes to eliminating the restriction of the arrangement of the ocular optical system. These three reflecting surfaces are all provided on the same prism and this facilitates assemblage of the finder optical system.

A field mask may be disposed just after the exit surface for cutting undesired light from reaching the observer's eye.

It is desirable that the angle between the chief ray entering the first reflecting surface and the chief ray entering the third reflecting surface or their extension lines is an obtuse angle (larger than 90°), and the angle between the chief ray entering the first reflecting surface and the chief ray entering the exit surface or their extension lines is an acute angle (smaller than 90°). This structure contributes to reducing the size of finder optical system both in thickness and width (in the direction of the width of camera).

It is desirable to provide the second reflecting surface and the exit surface on different areas of the same surface of the prism. This structure facilitates making the angle between the chief rays entering to the first reflecting surface and entering to the exit surface or their extension lines an acute angle.

The entrance surface is preferably a curved surface. This structure gives the entrance surface a function of a lens and will contributes to good imaging performance of the finder optical system.

The image erecting system preferably comprises a roof shaped reflecting surface for reducing the space occupied by the finder. This roof shaped reflecting surface is preferably placed on the ocular system side of the intermediate image surface for reducing thickness of the objective optical system. Usually, there is more room on the side of the ocular optical system than on the side of the objective optical system in the finder optical system. Therefore, this structure contributes to miniaturize the whole dimension of the finder optical system.

The finder optical system according to this invention may includes a prism on the side of the ocular optical system for erecting an image which has, in order from an object toward down stream along the light traveling direction, an entrance surface, a first reflecting surface, a second reflecting surface and an exit surface. Similar to the foregoing, let the axial chief ray act as a reference light ray, and the plane including three intersecting points of each of an entrance surface, the first reflecting surface, a second reflecting surface and the axial chief ray, act as a reference plane.

Here, the first and second reflecting surfaces are so configured that the chief ray or projection thereof onto the reference plane is deflected in one angular direction relative to the light traveling direction on the first reflecting surface and the chief ray or projection thereof onto the reference plane is deflected in opposite angular direction to that by the first reflecting surface, relative to the light traveling direction on the second reflecting surface. Moreover, the second reflecting surface is formed as a roof shaped reflecting surface, and the first reflecting surface and the exit surface are provided on different areas of the same surface of the prism. This structure allows the thickness of the finder to become small.

This invention includes not only above described finder optical systems but also picture taking apparatus equipped with a finder optical systems according to this invention. In the picture taking apparatus according to this invention, the finder is provided separately with a picture taking optical system and the axial chief rays entering to each the finder optical system and the picture taking optical system are parallel or substantially parallel with each other.

Numerical Examples

Three numerical examples according to this invention will be explained below. In each example, a center of a specific optical surface (8-th surface and 14-th surface in example 1, 8-th surface in example 2, 7-th surface in example 3) is defined as an origin of a coordinate system for representing the decentered optical system disposed on the downstream side thereof with respect to the light traveling direction. In example 1, the surface 14 is a hypothetical surface and the center thereof is 0.200 mm on the downstream side from the center of the field mask (13-th surface) along the axial chief ray. The light ray starting from the center of an object and passing through the center of stop defines the axial chief ray.

For each of the coordinate systems engaged to the 8-th surface of example 1, the 8-th surface of example 2, and the 7-th surface of example 3, the line starting from the center of an object toward the first surface of the optical system along the axial chief ray is defined as the Z-axis, and the plane including the chief rays before and after deflection in the first prism P1 (FIG. 1 through FIG. 9) is defined as Y-Z plane. The plus sign of Z-axis is the direction from object toward the optical system. The Y-axis is in the Y-Z plane and perpendicular to the Z-axis. The plus sign of Y-axis is the direction toward the left side of the paper of the drawings. The X-axis is so defined that constructs a right-hand Cartesian coordinate system with the Y and Z axes.

The coordinate system engaged to the 14-th hypothetical surface of the example 1 is the same as the one obtained by parallel displacement of the coordinate system engaged to the 8-th surface in a manner that the origin thereof coincides with the center of the 14-th surface. The center of the surface 14 is positioned at a point of X=0.000, Y=18.484, and Z=1.972 in the coordinate system engaged to the 8-th surface. The 14-th surface is perpendicular to the Z-axis of the coordinate system engaged to the 8-th surface. Amount of decentering of this 14-th surface is represented by X=0, Y=0, Z=0, α=0, β=0, and γ=0 by the coordinate system engaged to the 14-th surface.

In numerical examples 1 through 3, each decentered surface is given the decentering in the X-Y plane, and each rotationally asymmetric surface is only symmetric with respect to the X-Y plane.

For the decentered surface, the x, y, and z coordinates of the apex thereof and the inclination angles α, β, and γ of the center line thereof relative to the X, Y, and Z axes, respectively, are given in the data list. The central axis is the Z-axis of the following equation (A) for a free shaped surface, or the following equation (D) for an aspherical surface. The sign of angles is plus for α and β when measured counterclockwise and for γ when measured clockwise from the corresponding axes of the coordinate system.

The space between the surfaces is given only when the successive surfaces construct a coaxial optical axis. The refractive index and Abbe's number are given in conventional manner.

A free shaped surface may be defined by the following equation:

$$Z = C_2 X + C_3 Y + C_4 X^2 + C_5 XY + C_6 Y^2 + C_7 X^3 + C_8 X^2 Y + \\ C_9 XY^2 + C_{10} Y^3 + C_{11} X^4 + C_{12} X^3 Y + C_{13} X^2 Y^2 + \\ C_{14} XY^3 + C_{15} Y^4 + C_{16} X^5 + C_{17} X^4 Y + C_{18} X^3 Y^2 + \\ C_{19} X^2 Y^3 + C_{20} XY^4 + C_{21} Y^5 + C_{22} X^6 + C_{23} X^5 Y + \\ C_{24} X^4 Y^2 + C_{25} X^3 Y^3 + C_{26} X^2 Y^4 + C_{27} XY^5 + C_{28} Y^6 + \\ C_{29} X^7 + C_{30} X^6 Y + C_{31} X^5 Y^2 + C_{32} X^4 Y^3 + C_{33} X^3 Y^4 + \\ C_{34} X^2 Y^5 + C_{35} XY^6 + C_{36} Y^7 \quad (A)$$

where $C_j$ (j is integer equal to or more than 2) is a coefficient.

In the above equation, when the odd terms of X are all zero (0), that is, when the coefficients $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, . . . are all zero, the free shaped surface is symmetric only with respect to a plane parallel to the Y-Z plane.

In the above equation, when the odd terms of Y are all zero (0), that is, when the coefficients $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, . . . are all zero, the free shaped surface is symmetric only with respect to a plane parallel to the X-Z plane.

In the data list, the coefficients of the value zero are omitted. The refractive index is a value at a wavelength of the d-line, that is, 587.57 nm. The unit of length is millimeter.

A free shaped surface may be defined by the following Zernike polynomial:

$$x = R \cos(A)$$

$$y = R \sin(A)$$

$$z = D_2 + D_3 R \cos(A) + D_4 R \sin(A) + D_5 R^2 \cos(2A) + D_6 \\ (R^2-1) + D_7 R^2 \sin(2A) + D_8 R^3 \cos(3A) + D_9 (3R^3 - \\ 2R)\cos(A) + D_{10}(3R^3-2R)\sin(A) + D_{11}R^3 \sin(3A) + \\ D_{12}R^4 \cos(4A) + D_{13}(4R^4-3R^2)\cos(2A) + D_{14}(6R^4- \\ 6R^2+1) + D_{15}(4R^4-3R^2)\sin(2A) + D_{16}R^4\sin(4A) + \\ D_{17}R^5\cos(5A) + D_{18}(5R^5-4R^3)\cos(3A) + D_{19} \\ (10R^5-12R^3+3R)\cos(A) + D_{20}(10R^5-12R^3+3R)\sin \\ (A) + D_{21}(5R^5-4R^3)\sin(3A) + D_{22}R^5\sin(5A) + \\ D_{23}R^6\cos(6A) + D_{24}(6R^6-5R^4)\cos(4A) + D_{25} \\ (15R^6-20R^4+6R^2)\cos(2A) + D_{26}(20R^6-30R^4+ \\ 12R^2-1) + D_{27}(15R^6-20R^4+6R^2)\sin(2A) + D_{28} \\ (6R^6-5R^4)\sin(4A) + D_{29}\sin(6A) \quad (B)$$

The Z-axis of the equation (B) is the axis of the surface represented by Zernike polynomial. In equation (B), a coordinate value z of a point on a rotationally asymmetric surface is given by a function of x and y represented by polar coordinate system in X-Y plane, in which R is a distance from Z-axis in X-Y plane, A is an azimuth angle measured from X-axis.

A symmetric surface in the direction of X-axis is designed by using the coefficients $D_4$, $D_5$, $D_6$, $D_{10}$, $D_{11}$, $D_{12}$, $D_{13}$, $D_{14}$, $D_{20}$, $D_{21}$, $D_{22}$ . . . .

A free shaped surface may be defined by the equation Z=ΣΣCnm X Y. In case of K=7(expanded up to 7-th order term), this equation is as follows:

$$Z = C_2 + C_3 Y + C_4 |X| + C_5 Y^2 + C_6 Y|X| + C_7 X^2 + C_8 Y^3 + C_9 Y^2 |X| + \\ C_{10} YX^2 + C_{11}|X^3| + C_{12} Y^4 + C_{13} Y^3 |X| + C_{14} Y^2 X^2 + \\ C_{15} Y|X^3| + C_{16} X^4 + C_{17} Y^5 + C_{18} Y^4 |X| + C_{19} Y^3 X^2 + \\ C_{20} Y^2 |X^3| + C_{21} YX^4 + C_{22}|X^5| + C_{23} Y^6 + C_{24} Y^5 |X| + \\ C_{25} Y^4 X^2 + C_{26} Y^3 |X^3| + C_{27} Y^2 X^4 + C_{28} Y|X^5| + C_{29} X^6 + \\ C_{30} Y^7 + C_{31} Y^6 |X| + C_{32} Y^5 X^2 + C_{33} Y^4 |X^3| + C_{34} Y^3 X^4 + \\ C_{35} Y^2 |X^5| + C_{36} YX^6 + C_{37}|X^7| \quad (C)$$

In the numerical examples of this invention, as the numerical data are given based on the equation (A), the same surface can be given by the data based on the equation (B) or (C). In the numerical examples, only a free shaped surface is symmetric only in the x direction, but may also be asymmetric in y direction. The apex of each surface is on the same plane (Y-Z plane), but it may be apart from the Y-Z plane.

The rotationally symmetric aspherical surface is defined by the following equation:

$$Z = (y^2/R)/[1+\{1-(1+K)y^2/R^2\}^{1/2}] + Ay^4 + By^6 + Cy^8 + Dy^{10} + \quad (D)$$

where the Z-axis coincides with an optical axis (axial chief ray) whose plus sign is in the light traveling direction, the Y-axis is perpendicular to the Z-axis. R is the radius of curvature of the surface on the optical axis, K is a conic constant, and A, B, C, D, . . . are aspheric coefficients of 4-th order, 6-th order, 8-th order, 10-th order, . . . , respectively. The Z-axis is an axis of rotation symmetry of the aspherical surface.

In the numerical examples 1 through 3, the virtual image is formed at a position of −0.5 diopter($m^{-1}$) (2000 mm) on the object side of the pupil plane. However, on the lens data, an ideal lens having a focal length of 31.62 mm is added at a position of 31.62 mm($\sqrt{1000}$ mm) apart from the pupil plane for the convenience of designing the optical system.

The lenses or prisms in the numerical examples are made of plastic material but may be made of glass material. In case plastic material is used, low hygroscopic material, such as Zeonex sold by Zeon Corporation, is preferable to prevent the degradation of performance due to changing conditions.

The surfaces formed as a spherical surface or an aspherical surface in the numerical examples are replaceable by a rotationally asymmetric surface.

A flare stop may be placed before the entrance or after exit surface of the prism, or before or after the movable unit or fixed lens unit. The flare may be cut by the lens frame or other element.

The structure of the image erecting systems is not limited to the prisms used in the numerical examples and other types of prism can be used for the erecting system. An anti-reflection coating may be applied on the optical surfaces of the lens or prism to prevent light loss.

A lens component having optical power, such as an ocular lens, objective lens or prism, may be moved for the purpose of adjusting the diopter scale, aside from zooming. Two of more optical components, for example, both ocular lens and objective lens can be moved for this purpose.

The definition of focal length was already described. That definition is measured in longitudinal direction and therefore, an error caused by spherical aberration will be included. Other definition may be used which is measured in the lateral direction. However, this definition will include an error caused by distortion. So, it is desirable to adequately select the definition less affected by aberrations. The second definition of focal length usable in this invention is as follows. When a light ray having a small angle $\Delta\beta$ (radian) relative to the axial chief ray enters the optical system and an image having height $\Delta h$ is formed by the optical system, the focal length f of the optical system is given by:

$$f=\Delta I h/\Delta\beta$$

Numerical Example 1

Figure 2:
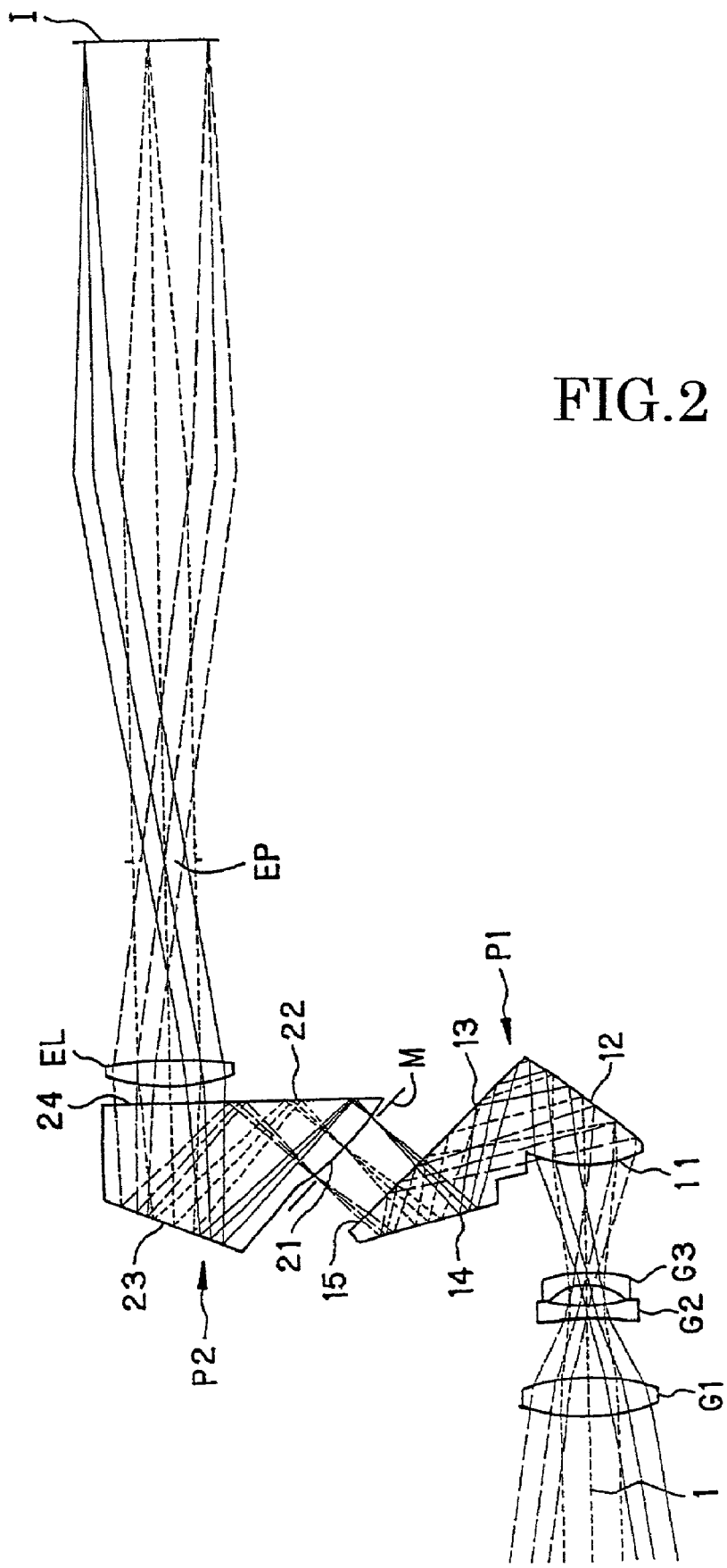
FIG. 2 is a sectional view of the first numerical example of this invention taken along the Y-Z plane at a standard state.
Figure 3:
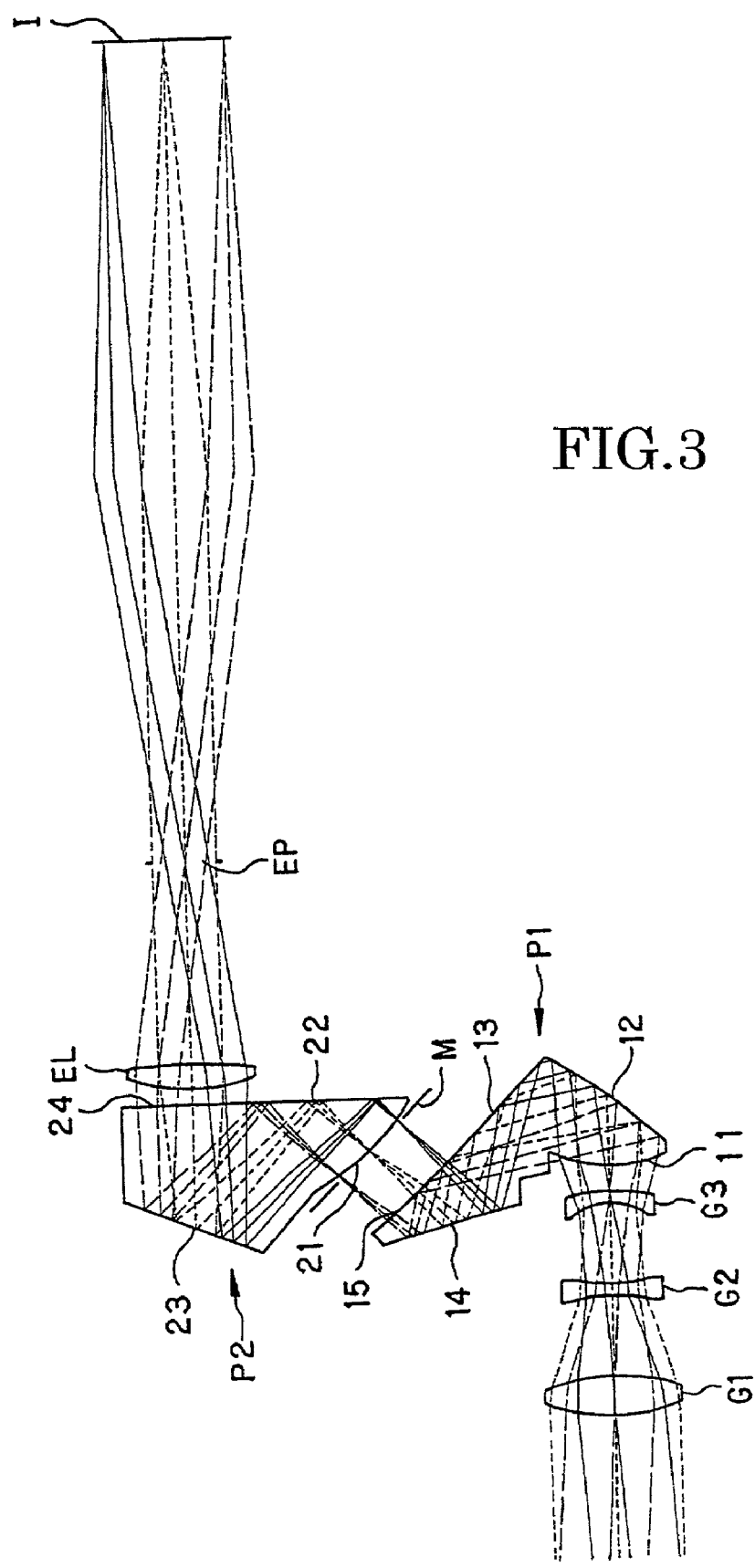
FIG. 3 is a sectional view of the first numerical example of this invention taken along the Y-Z plane at a telephoto end.

FIG. 1 through FIG. 3 show the sectional view of the numerical example 1 taken along the Y-Z plane including axial chief ray. FIG. 1 shows a wide angle end, FIG. 2 shows an standard state, and FIG. 3 shows a telephoto end.

The half field angle in the X direction is 13.62°~6.18°~2.77°, the half field angle in the Y direction is 19.80°~9.14°~4.12°, the diameter of the pupil is 5 mm, the size of the intermediate image is 4.24×6.30 mm(diagonal length is 7.59 mm, maximum image height is 3.80 mm), the magnification power of the finder is 0.42~0.93~2.08, the focal length of the objective optical system corresponds to 8.75~19.57~43.75 mm in terms of a value for a rotationally symmetric optical system, and the focal length of the ocular system is 21.0 mm.

The numerical example 1 comprises, in order from an object toward the light traveling direction, an objective optical system which comprises a fixed first lens unit G1 composed of a biconvex positive lens element having a rotationally symmetric aspherical surface on the image side, a movable second lens unit G2 composed of a biconcave negative lens element having a rotationally symmetric aspherical surface on the image side, a movable third lens unit G3 composed of a negative meniscus lens element convex on the pupil side having a rotationally symmetric aspherical surface on the object side, a flare stop (not shown), a prism P1 having a first positive transmission surface 11, a first positive reflecting surface 12, a second reflecting 13 surface having a negative power in Y direction and a positive power in X direction, a third negative reflecting surface 14, a second transmission surface 15 having a negative power in Y direction and a positive power in X direction, a field mask M for defining field of view, a second positive prism P2 having a first positive transmission surface 21, a first reflecting surface 22, a second roof shaped reflecting surface 23, and a second transmission surface 24, and an ocular optical system EL composed of a biconvex positive lens element having a rotationally symmetric aspherical surface on the object side. EP is an exit pupil which corresponds to stop in the data list. The second transmission surface 15 and second reflecting surface 13 of the first prism P1, and the second transmission surface 24 and first reflecting surface 21 of the second prism P2, are provided on the same surface part of which has a transmission function and part of which has a reflection function, respectively. The first transmission surface 11, the first reflecting surface 12, the second reflecting surface 13 (same surface as the second transmission surface), the third reflecting surface 14 of the prism P1 are formed as free shaped surfaces.

The first prism P1 is configured so that the axial chief ray is deflected by the first reflecting surface 12 and the second reflecting surface 13 toward the same angular direction, and further deflected by the third reflecting surface 14 toward the opposite angular direction. The second prism P2 is configured so that the axial chief ray is deflected by the first reflecting surface 22 toward one angular direction and deflected by the second reflecting surface 23 toward the another angular direction.

In the second prism P2, though, the first reflecting surface 22 and the second roof shaped reflecting surface 23 are both composed a plane reflecting surfaces, an aspherical surface or free shaped curved surface may be used on these surfaces. The first transmission surface 21 of the prism P2 may be formed as a rotationally symmetric aspherical surface or a free shaped curved surface instead of a spherical surface.

Though the axial chief ray 1 transmitted through the prism P1 and that transmitted through the prism P2 are laid in the same plane, they may be skew according to the layout inside the camera.

The amounts of decentering for the 9-th through 14-th surfaces relative to the reference surface 1, and for the 15-th through 18-th surfaces relative to the reference surface 2, are given in the data list, respectively. Image I is substantially perpendicular to the Z-axis.

Numerical Example 2

Figure 4:
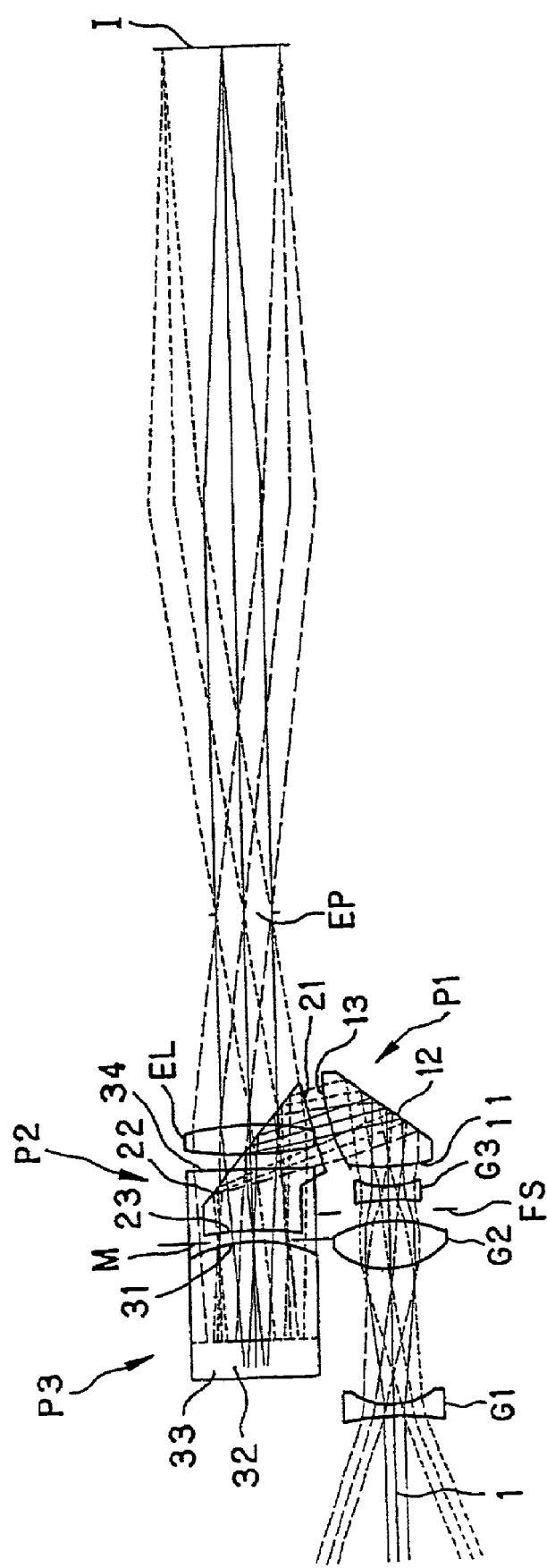
FIG. 4 is a sectional view of the second numerical example of this invention taken along the Y-Z plane at a wide angle end.
Figure 5:
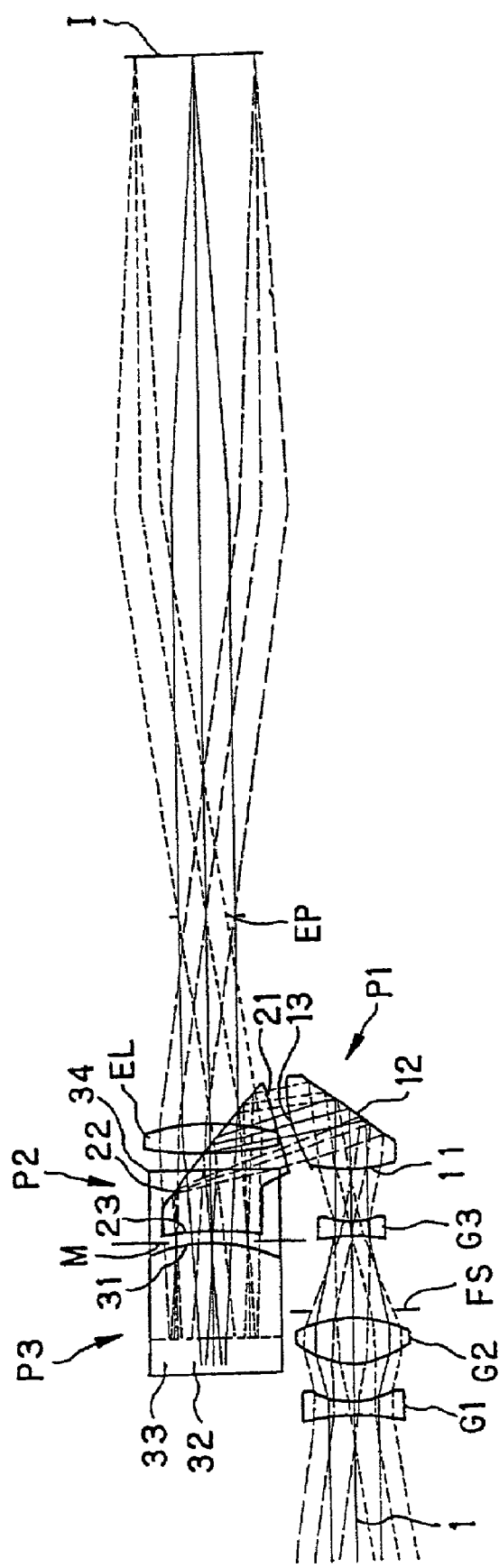
FIG. 5 is a sectional view of the second numerical example of this invention taken along the Y-Z plane at a standard state.
Figure 6:
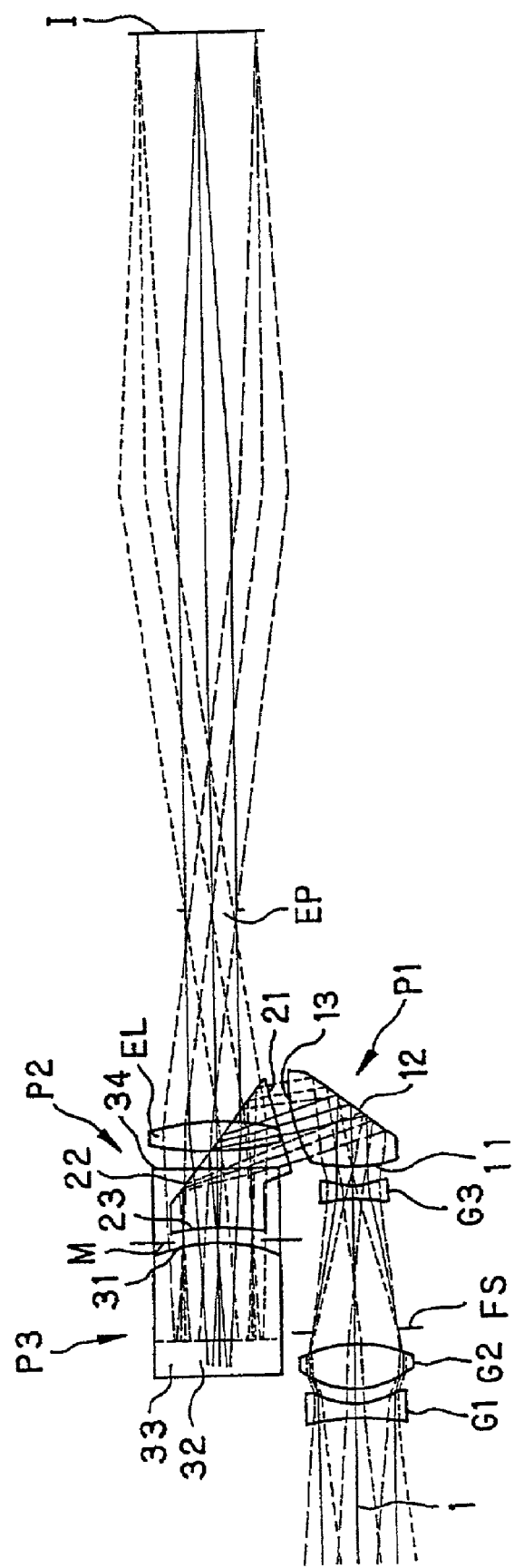
FIG. 6 is a sectional view of the second numerical example of this invention taken along the Y-Z plane at a telephoto end.

FIG. 4 through FIG. 6 show the sectional view of the numerical example 2 taken along the Y-Z plane including axial chief ray. FIG. 4 shows a wide angle end, FIG. 5 shows an standard state, and FIG. 6 shows a telephoto end.

The half field angle in the X direction is 13.74°~5.79°~3.66°, the half field angle in the Y direction is 19.82°~8.51°~5.39°, the diameter of pupil is 4 mm, the size of the intermediate image is 3.96×5.84 mm(diagonal length is 7.06 mm, maximum image height is 3.53 mm), the magnification power of the finder is 0.4~0.96~1.52, the focal length of the objective optical system corresponds to 8.10~19.52~30.94 mm in terms of a value for a rotationally symmetric optical system, and the focal length of the ocular system is 20.4 mm.

The numerical example 2 comprises, in order from an object toward the light traveling direction, an objective optical system which comprises a fixed first lens unit G1 composed of a biconcave negative lens element having a rotationally symmetric aspherical surface on the image side, a movable second lens unit G2 composed of a biconvex positive lens element having a rotationally symmetric aspherical surface on both the object side and the image side, a flare stop FS movable with the second lens unit G2, a movable third lens unit G3 composed of a negative biconcave lens element having a rotationally symmetric aspherical surface on the object side, a first prism P1 having a first positive transmission surface 11, a first positive reflecting surface 12, a second positive transmission surface 13, a second prism P2 having a negative first transmission surface 21, a positive first reflecting surface 22, and a negative second transmission surface 23, a field mask M for defining field of view, a third positive prism P3 having a first positive transmission surface 31, a first reflecting surface 32, a second reflecting surface 33, and a second transmission surface 34, and an ocular optical system EL composed of a biconvex positive lens element having a rotationally symmetric aspherical surface on the object side. EP is an exit pupil which corresponds to stop in the data list. The first transmission surface 11, first reflecting surface 12 and the second transmission surface 13 of the first prism P1, and the second transmission surface 23 of the second prism P2, are formed as a free shaped curved surfaces. The first through third prisms P1~P3 compose a Porro-prism.

In the third prism P3, though the first reflecting surface 32, the second reflecting surface 33, and the second transmission surface 34 are all formed as plane surfaces, an aspherical surface or free shaped curved surface may be used on these surfaces. The first transmission surface 21 of the prism 2 and the first transmission surface 31 of the prism 3 may be formed as a rotationally symmetric aspherical surface or a free shaped curved surface instead of a spherical surface. The first reflecting surface 21 of the second prism P2 may be formed as a free shaped curved surface instead of a rotationally symmetric aspherical surface.

The amounts of decentering for the 9-th through 18-th surfaces relative to the reference surface are given in the data list. Image I is substantially perpendicular to the Z-axis.

Numerical Example 3

Figure 7:
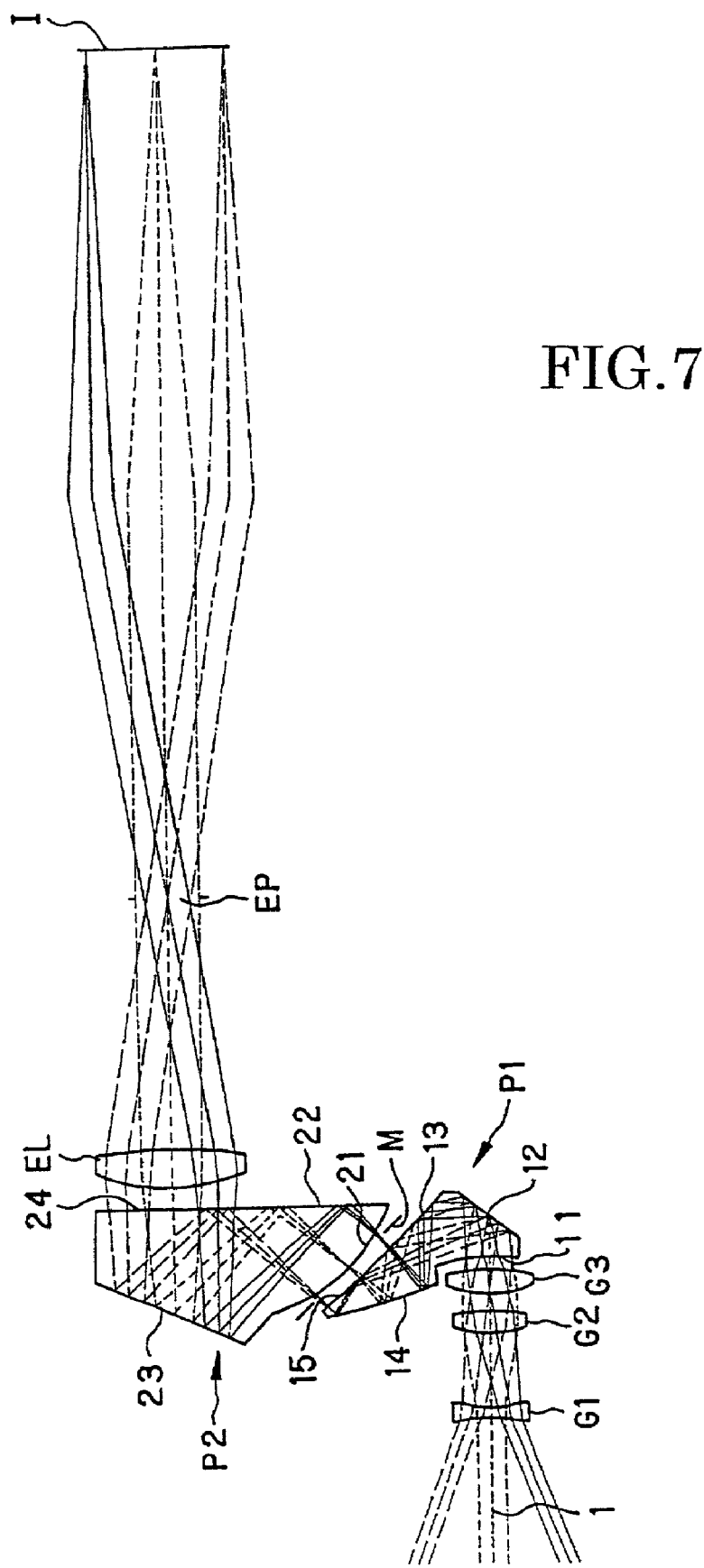
FIG. 7 is a sectional view of the third numerical example of this invention taken along the Y-Z plane at a wide angle end.
Figure 8:
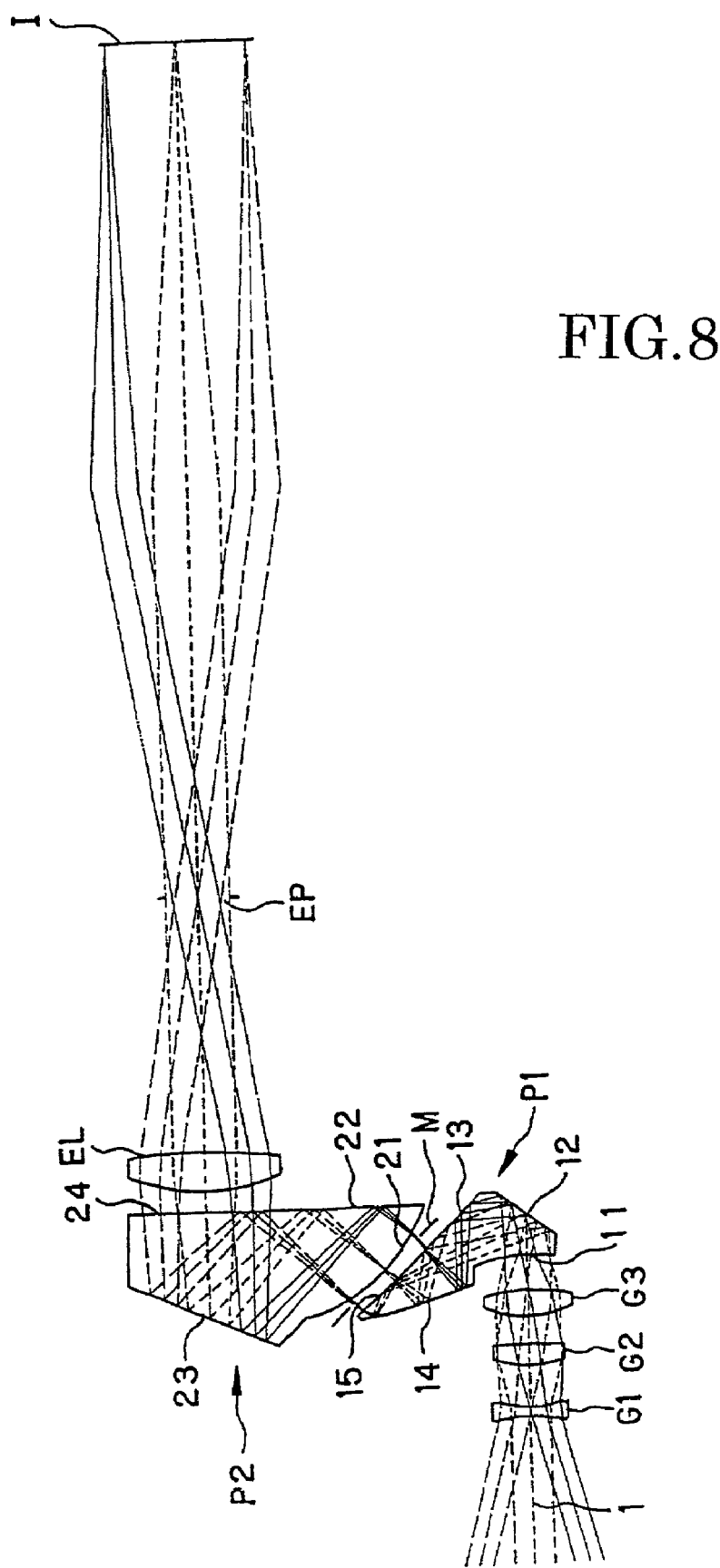
FIG. 8 is a sectional view of the third numerical example of this invention taken along the Y-Z plane at a standard state.
Figure 9:
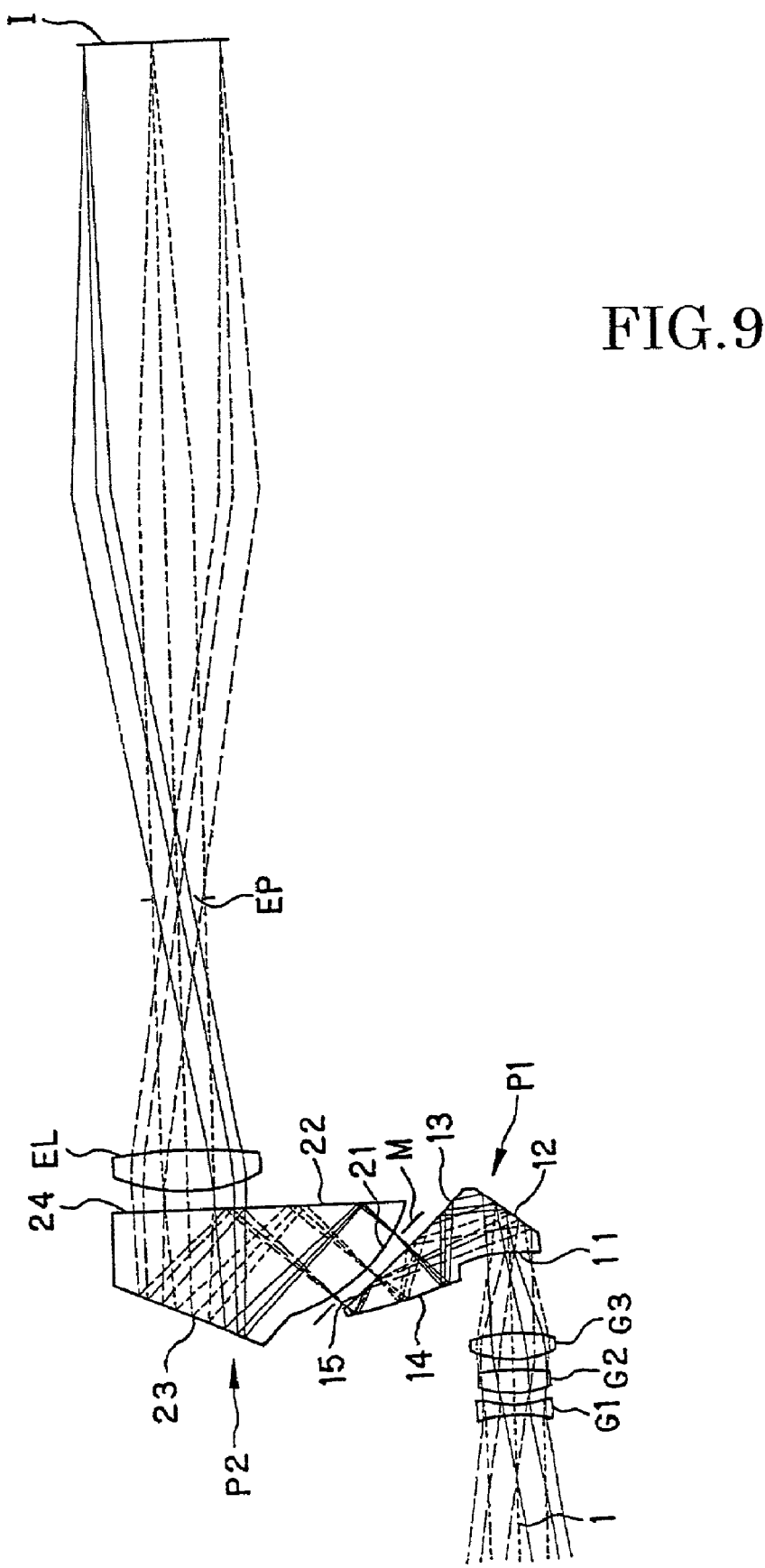
FIG. 9 is a sectional view of the third numerical example of this invention taken along the Y-Z plane at a telephoto end.

FIG. 7 through FIG. 9 show the sectional view of the numerical example 3 taken along the Y-Z plane including axial chief ray. FIG. 7 shows a wide angle end, FIG. 8 shows an standard state, and FIG. 9 shows a telephoto end.

The half field angle in the X direction is 12.21°~8.75°~5.43°, the half field angle in the Y direction is 20.45°~14.86°~9.31°, the diameter of the pupil is 4 mm, the intermediate image size is 3.76×6.48 mm(diagonal length is 6.63 mm, maximum image height is 3.75 mm), the magnification power of the finder is 0.45~0.63~1.01, the focal length of the objective optical system corresponds to 8.69~12.21~19.76 mm in terms of a value for a rotationally symmetric optical system, and the focal length of the ocular system is 19.5 mm.

The numerical example 1 comprises, in order from an object toward the light traveling direction, an objective optical system which comprises a fixed first lens unit G1 composed of a biconcave negative lens element having a rotationally symmetric aspherical surface on the image side, a movable second lens unit G2 composed of a biconvex positive lens element having a rotationally symmetric aspherical surface on the object side, a movable third lens unit G3 composed of a positive biconvex lens element having a rotationally symmetric aspherical surface on the image side, a prism P1 having a first negative transmission surface 11, a first negative reflecting surface 12, a second negative reflecting 13, a third positive reflecting surface 14, a second negative transmission surface 15, a field mask M for defining field of view, a second positive prism P2 having a first positive transmission surface 21, a first reflecting surface 22, a second roof shaped reflecting surface 23, and a second transmission surface 24, and an ocular optical system EL composed of a biconvex positive lens element having a rotationally symmetric aspherical surface on the object side. EP is an exit pupil which corresponds to stop in the data list. The second transmission surface 15 and second reflecting surface 13 of the first prism P1, and the second transmission surface 24 and first reflecting surface 22 of the second prism P2, are provided on the same surface part of which has a transmission function and part of which has a reflection function, respectively. The first transmission surface 11, the first reflecting surface 12, the second reflecting surface 13 (same surface as the second transmission surface), and the third reflecting surface 14 of the prism P1 are formed as free shaped curved surfaces.

The first prism P1 is configured so that the axial chief ray is deflected by the first reflecting surface 12 and the second reflecting surface 13 toward the same angular direction, and further deflected by the third reflecting surface 14 toward the opposite angular direction. The second prism P2 is configured so that the axial chief ray is deflected by the first reflecting surface 22 toward one angular direction and deflected by the second reflecting surface toward the another angular direction.

In the second prism P2, though the first reflecting surface 22, the second reflecting surface 23 and the second transmission surface 24 are all formed as plane surfaces, an aspherical surface or a free shaped curved surface may be used on these surfaces. The first transmission surface 21 of the prism 2 may be formed as a rotationally symmetric aspherical surface or a free shaped curved surface instead of a spherical surface.

Through the axial chief ray 1 transmitted through the prism 1 and that transmitted through the prism 2 are laid in the same plane, they may be arranged in a twisted position according to the layout inside the camera.

The amounts of decentering for the 8-th through 17-th surfaces relative to the reference surface are given in the data list, respectively. Image I is substantially perpendicular to the Z-axis.

The data lists of the numerical examples 1 through 3 are shown below. In the lists, FFS means a free shaped curved surface, ASS means an aspherical surface, RP means a reference surface, HRP means a hypothetical surface, RE means a reflecting surface, FS means a flare stop, and FM means a field mask. With respect to the zooming space, WE means a wide angle end, and FM means an standard state, and TE means a telephoto end.

Data list of the numerical example 1

| No. of surface | radius of curvature | space of surfaces | decentering data | refractive index | Abbe's number |
|---|---|---|---|---|---|
| object | ∞ | 3000.000 | | | |
| 1 | 15.4028 | 3.050 | | 1.5242 | 55.8 |
| 2 | ASS1 | d1 | | | |
| 3 | −11.1619 | 0.800 | | 1.5842 | 30.5 |
| 4 | ASS2 | d2 | | | |
| 5 | ASS3 | 0.800 | | 1.4923 | 57.8 |
| 6 | −16.2248 | d3 | | | |
| 7 | ∞ (FS) | 1.393 | | | |
| 8 | FFS1(RP1) | | | 1.5254 | 55.8 |
| 9 | FFS2(RE) | | Dec 1 | 1.5254 | 55.8 |
| 10 | FFS3 | | Dec 2 | | |
| 11 | FFS4(RE) | | Dec 3 | 1.5254 | 55.8 |
| 12 | FFS3 | | Dec 2 | 1.5254 | 55.8 |

-continued

| | | | | | |
|---|---|---|---|---|---|
| 13 | ∞ (FM) | 0.200 | Dec 4 | | |
| 14 | ∞(HRP, RP2) | | Dec 5 | | |
| 15 | 20.8562 | | Dec 6 | 1.5254 | 55.8 |
| 16 | ∞ (RE) | | Dec 7 | 1.5254 | 55.8 |
| 17 | ∞ (RE) | | Dec 8 | 1.5254 | 55.8 |
| 18 | ∞ | 1.364 | Dec 9 | | |
| 19 | ASS4 | 2.100 | | 1.4923 | 57.8 |
| 20 | −40.4230 | 16.500 | | | |
| 21 | ∞ (stop) | 31.623 | | | |
| 22 | ∞ | 32.123 | | | |
| Image | ∞ | | | | |

| | ASS1 | ASS2 | ASS3 | ASS4 |
|---|---|---|---|---|
| R | −13.1539 | 7.2024 | −4.6541 | 13.8789 |
| K | −8.9795 | −1.2095 | $7.3684 \times 10^{-1}$ | 1.3810 |
| A | $4.1345 \times 10^{-6}$ | $-3.0949 \times 10^{-3}$ | $7.0164 \times 10^{-5}$ | $-2.0827 \times 10^{-4}$ |
| B | $1.9813 \times 10^{-7}$ | $-9.5330 \times 10^{-5}$ | $9.3388 \times 10^{-5}$ | $5.3546 \times 10^{-6}$ |
| C | $-8.5142 \times 10^{-9}$ | $2.2060 \times 10^{-5}$ | $-1.6029 \times 10^{-5}$ | $-2.6643 \times 10^{-7}$ |
| D | $2.5176 \times 10^{-10}$ | $-1.0489 \times 10^{-6}$ | $1.7062 \times 10^{-6}$ | $3.4809 \times 10^{-9}$ |

| | FFS1 | FFS2 | FFS3 | FFS4 |
|---|---|---|---|---|
| C4 | $6.4716 \times 10^{-2}$ | $-5.4072 \times 10^{-3}$ | $-7.5330 \times 10^{-3}$ | $-7.3414 \times 10^{-3}$ |
| C6 | $5.2950 \times 10^{-2}$ | $-6.2109 \times 10^{-3}$ | $3.3523 \times 10^{-4}$ | $-2.0351 \times 10^{-3}$ |
| C8 | $1.8672 \times 10^{-4}$ | $-1.2935 \times 10^{-5}$ | $-9.1171 \times 10^{-5}$ | $5.2113 \times 10^{-5}$ |
| C10 | $9.0036 \times 10^{-4}$ | $-8.3903 \times 10^{-6}$ | $-4.5269 \times 10^{-5}$ | $3.2070 \times 10^{-5}$ |
| C11 | $8.9994 \times 10^{-5}$ | $9.1513 \times 10^{-5}$ | $9.0797 \times 10^{-5}$ | $9.9675 \times 10^{-5}$ |
| C13 | $-1.3082 \times 10^{-4}$ | $4.8228 \times 10^{-5}$ | $3.3453 \times 10^{-5}$ | $-1.1612 \times 10^{-5}$ |
| C15 | $-5.5337 \times 10^{-6}$ | $1.3579 \times 10^{-5}$ | $2.7796 \times 10^{-6}$ | $-8.4097 \times 10^{-6}$ |

[Dec 1]

| X | 0.000 | Y | 0.000 | Z | 5.576 |
|---|---|---|---|---|---|
| α | −38.025 | β | 0.000 | γ | 0.000 |

[Dec 2]

| X | 0.000 | Y | 10.507 | Z | 2.969 |
|---|---|---|---|---|---|
| α | 44.977 | β | 0.000 | γ | 0.000 |

[Dec 3]

| X | 0.000 | Y | 12.293 | Z | −4.214 |
|---|---|---|---|---|---|
| α | 15.476 | β | 0.000 | γ | 0.000 |

[Dec 4]

| X | 0.000 | Y | 18.343 | Z | 1.831 |
|---|---|---|---|---|---|
| α | 44.992 | β | 0.000 | γ | 0.000 |

[Dec 5]

| X | 0.000 | Y | 0.000 | Z | 0.000 |
|---|---|---|---|---|---|
| α | 0.000 | β | 0.000 | γ | 0.000 |

[Dec 6]

| X | 0.000 | Y | 0.000 | Z | 0.000 |
|---|---|---|---|---|---|
| α | 45.000 | β | 0.000 | γ | 0.000 |

[Dec 7]

| X | 0.000 | Y | 3.889 | Z | 3.889 |
|---|---|---|---|---|---|
| α | 0.000 | β | 0.000 | γ | 0.000 |

[Dec 8]

| X | 0.000 | Y | 3.665 | Z | −5.887 |
|---|---|---|---|---|---|
| α | −22.500 | β | 0.000 | γ | 0.000 |

[Dec 9]

| X | 0.000 | Y | 13.665 | Z | 3.889 |
|---|---|---|---|---|---|
| α | 0.000 | β | 0.000 | γ | 0.000 |

| Zooming space | WE | ST | TE |
|---|---|---|---|
| d1 | 0.7199 | 4.5644 | 6.2253 |
| d2 | 2.4090 | 1.8184 | 6.5284 |
| d3 | 10.3011 | 7.0472 | 0.6763 |

Data list of the numerical example 2

| No. of surface | Radius of curvature | space of surfaces | decentering data | refractive index | Abbe's number |
|---|---|---|---|---|---|
| object | ∞ | 3000.000 | | | |
| 1 | −18.4908 | 1.000 | | 1.5842 | 30.5 |
| 2 | ASS1 | d1 | | | |
| 3 | ASS2 | 3.500 | | 1.5254 | 55.8 |
| 4 | ASS3 | 1.000 | | | |
| 5 | ∞ (FS) | d2 | | | |
| 6 | ASS4 | 1.000 | | 1.5842 | 30.5 |
| 7 | 4.6567 | d3 | | | |
| 8 | FFS1(RP) | | | 1.5254 | 55.8 |
| 9 | FFS2(RE) | | Dec 1 | 1.5254 | 55.8 |
| 10 | FFS3 | | Dec 2 | | |
| 11 | −223.4940 | | Dec 3 | 1.5254 | 55.8 |
| 12 | ASS5(RE) | | Dec 4 | 1.5254 | 55.8 |
| 13 | FFS4 | | Dec 5 | | |
| 14 | ∞ (FM) | | Dec 6 | | |

-continued

| | | | | | |
|---|---|---|---|---|---|
| 15 | 11.0020 | | Dec 6 | 1.5254 | 55.8 |
| 16 | ∞ (RE) | | Dec 7 | 1.5254 | 55.8 |
| 17 | ∞ (RE) | | Dec 8 | 1.5254 | 55.8 |
| 18 | ∞ | 1.250 | Dec 9 | | |
| 19 | ASS6 | 2.300 | | 1.4924 | 57.6 |
| 20 | −18.3020 | 16.200 | | | |
| 21 | ∞(stop) | 31.623 | | | |
| 22 | ∞ | 32.123 | | | |
| image | ∞ | | | | |

| | ASS1 | ASS2 | ASS3 | ASS4 |
|---|---|---|---|---|
| R | 5.5834 | 4.9176 | −7.2573 | −12.0229 |
| K | 0.0000 | −3.4370 | 0.0000 | 0.0000 |
| A | $-1.7911 \times 10^{-3}$ | $1.7731 \times 10^{-3}$ | $1.1263 \times 10^{-3}$ | $3.5103 \times 10^{-3}$ |
| B | $4.8896 \times 10^{-6}$ | $-1.4020 \times 10^{-4}$ | $-6.7780 \times 10^{-5}$ | $-5.8117 \times 10^{-4}$ |
| C | $2.3204 \times 10^{-6}$ | $7.9644 \times 10^{-6}$ | $5.6602 \times 10^{-6}$ | $4.7020 \times 10^{-5}$ |
| D | $-1.6745 \times 10^{-7}$ | $-2.0335 \times 10^{-7}$ | $-1.7280 \times 10^{-7}$ | $-3.1084 \times 10^{-7}$ |

| | ASS5 | ASS6 |
|---|---|---|
| R | −292.2265 | 21.7188 |
| K | 0.0000 | 0.0000 |
| A | $-1.5887 \times 10^{-5}$ | $-1.4004 \times 10^{-4}$ |
| B | $8.5387 \times 10^{-10}$ | $5.4915 \times 10^{-6}$ |
| C | $2.0212 \times 10^{-8}$ | $-2.0055 \times 10^{-7}$ |
| D | $-4.6765 \times 10^{-10}$ | $2.8537 \times 10^{-9}$ |

| | FFS1 | FFS2 | FFS3 | FFS4 |
|---|---|---|---|---|
| C4 | $4.8871 \times 10^{-2}$ | $-1.4463 \times 10^{-3}$ | $-3.4496 \times 10^{-2}$ | $1.1828 \times 10^{-2}$ |
| C6 | $4.2387 \times 10^{-2}$ | $-1.8423 \times 10^{-3}$ | $-3.3598 \times 10^{-2}$ | $2.3107 \times 10^{-2}$ |
| C8 | $-2.3012 \times 10^{-3}$ | $-6.4038 \times 10^{-4}$ | $-1.5818 \times 10^{-3}$ | $-2.8614 \times 10^{-4}$ |
| C10 | $6.8540 \times 10^{-4}$ | $4.1676 \times 10^{-5}$ | $-7.1023 \times 10^{-4}$ | $-6.6202 \times 10^{-4}$ |
| C11 | $-1.1256 \times 10^{-3}$ | $-1.4349 \times 10^{-4}$ | $-1.6051 \times 10^{-4}$ | $5.1691 \times 10^{-4}$ |
| C13 | $-7.7649 \times 10^{-4}$ | $2.2752 \times 10^{-4}$ | $-1.5080 \times 10^{-3}$ | $9.9880 \times 10^{-4}$ |
| C15 | $-1.0144 \times 10^{-3}$ | $3.6772 \times 10^{-5}$ | $-6.1996 \times 10^{-4}$ | $3.8260 \times 10^{-4}$ |
| C22 | $-6.8428 \times 10^{-5}$ | | | |
| C28 | $5.9237 \times 10^{-5}$ | | | |

[Dec 1]

| X | 0.000 | Y | 0.000 | Z | 4.596 |
|---|---|---|---|---|---|
| α | −37.995 | β | 0.000 | γ | 0.000 |

[Dec 2]

| X | 0.000 | Y | 4.265 | Z | 3.530 |
|---|---|---|---|---|---|
| α | 103.996 | β | 0.000 | γ | 0.000 |

[Dec 3]

| X | 0.000 | Y | 5.491 | Z | 3.230 |
|---|---|---|---|---|---|
| α | 103.984 | β | 0.000 | γ | 0.000 |

[Dec 4]

| X | 0.000 | Y | 10.165 | Z | 2.051 |
|---|---|---|---|---|---|
| α | 52.019 | β | 0.000 | γ | 0.000 |

[Dec 5]

| X | 0.000 | Y | 10.147 | Z | −4.274 |
|---|---|---|---|---|---|
| α | 180.000 | β | 0.000 | γ | 0.000 |

[Dec 6]

| X | 0.000 | Y | 10.154 | Z | −5.230 |
|---|---|---|---|---|---|
| α | 180.000 | β | 0.000 | γ | 0.000 |

[Dec 7]

| X | 0.000 | Y | 10.154 | Z | −12.500 |
|---|---|---|---|---|---|
| α | 0.000 | β | −45.000 | γ | 0.000 |

[Dec 8]

| X | 8.000 | Y | 10.154 | Z | 12.500 |
|---|---|---|---|---|---|
| α | 0.000 | β | 45.000 | γ | 0.000 |

[Dec 9]

| X | 8.000 | Y | 10.154 | Z | 0.130 |
|---|---|---|---|---|---|
| α | 0.000 | β | 0.000 | γ | 0.000 |

| Zooming space | WE | ST | TE |
|---|---|---|---|
| d1 | 9.8865 | 2.7237 | 0.9906 |
| d2 | 0.5655 | 5.1482 | 9.4105 |
| d3 | 1.3880 | 3.9681 | 1.4389 |

Data list of the numerical example 3

| No. of surface | Radius of curvature | space of surfaces | decentering data | refractive index | Abbe's number |
|---|---|---|---|---|---|
| object | ∞ | 3000.000 | | | |
| 1 | −9.9360 | 0.700 | | 1.5842 | 30.5 |
| 2 | ASS1 | d1 | | | |
| 3 | ASS2 | 1.650 | | 1.4924 | 57.6 |
| 4 | −20.2180 | d2 | | | |
| 5 | 7.5220 | 1.900 | | 1.4924 | 57.6 |
| 6 | ASS3 | d3 | | | |

-continued

| | | | | | |
|---|---|---|---|---|---|
| 7 | FFS1(RP) | | | 1.5254 | 55.8 |
| 8 | FFS2(RE) | | Dec 1 | 1.5254 | 55.8 |
| 9 | FFS3(RE) | | Dec 2 | 1.5254 | 55.8 |
| 10 | FFS4(RE) | | Dec 3 | 1.5254 | 55.8 |
| 11 | FFS3 | | Dec 2 | | |
| 12 | ∞ (FM) | | Dec 4 | | |
| 13 | 12.3160 | | Dec 4 | 1.5174 | 52.4 |
| 14 | ∞ (RE) | | Dec 5 | 1.5174 | 52.4 |
| 15 | ∞ (RE) | | Dec 6 | 1.5174 | 52.4 |
| 16 | ∞ | | Dec 5 | | |
| 17 | ∞ (HRP) | 1.493 | Dec 7 | | |
| 18 | ASS4 | 3.100 | | 1.4924 | 57.6 |
| 19 | −39.9010 | 19.820 | | | |
| 20 | ∞(stop) | 31.623 | | | |
| 21 | ∞ | 32.123 | | | |
| image | ∞ | | | | |

| | ASS1 | ASS2 | ASS3 | ASS4 |
|---|---|---|---|---|
| R | 6.4669 | 7.2658 | −11.0384 | 12.5564 |
| K | $-1.5785 \times 10^{1}$ | $-2.5200 \times 10^{-1}$ | $3.6890 \times 10^{-1}$ | 2.3643 |
| A | $5.5596 \times 10^{-3}$ | $-7.5100 \times 10^{-4}$ | $9.3094 \times 10^{-4}$ | $-2.4652 \times 10^{-4}$ |
| B | $-7.6382 \times 10^{-4}$ | $6.8611 \times 10^{-7}$ | $1.0122 \times 10^{-5}$ | $-4.7143 \times 10^{-6}$ |
| C | $6.5107 \times 10^{-5}$ | $1.3445 \times 10^{-6}$ | $-1.2595 \times 10^{-6}$ | $1.1915 \times 10^{-7}$ |
| D | $-2.4636 \times 10^{-6}$ | $-7.6509 \times 10^{-8}$ | $3.3171 \times 10^{-8}$ | $-3.6684 \times 10^{-9}$ |

| | FFS1 | FFS2 | FFS3 | FFS4 |
|---|---|---|---|---|
| C4 | $-4.0924 \times 10^{-2}$ | $5.4130 \times 10^{-3}$ | $1.3818 \times 10^{-2}$ | $1.2126 \times 10^{-2}$ |
| C6 | $-5.0754 \times 10^{-2}$ | $9.7876 \times 10^{-4}$ | $4.3982 \times 10^{-3}$ | $8.4521 \times 10^{-3}$ |
| C8 | $-1.7555 \times 10^{-3}$ | $-7.5504 \times 10^{-4}$ | $-7.5513 \times 10^{-4}$ | $-5.9389 \times 10^{-4}$ |
| C10 | $-2.2566 \times 10^{-3}$ | $-7.0795 \times 10^{-4}$ | $-3.0856 \times 10^{-4}$ | $-1.5609 \times 10^{-4}$ |
| C11 | $1.1685 \times 10^{-3}$ | $4.0175 \times 10^{-4}$ | $5.4888 \times 10^{-4}$ | $3.1710 \times 10^{-4}$ |
| C13 | $3.2927 \times 10^{-3}$ | $7.7976 \times 10^{-4}$ | $-9.9450 \times 10^{-5}$ | $-1.4026 \times 10^{-4}$ |
| C15 | $2.0027 \times 10^{-3}$ | $2.2828 \times 10^{-4}$ | $1.4455 \times 10^{-5}$ | $-5.8053 \times 10^{-6}$ |
| C17 | $-3.3108 \times 10^{-4}$ | $-2.4042 \times 10^{-5}$ | | $2.5965 \times 10^{-5}$ |
| C19 | $9.7538 \times 10^{-5}$ | $2.2693 \times 10^{-5}$ | | $-6.0311 \times 10^{-6}$ |
| C21 | $-2.5727 \times 10^{-4}$ | $-1.5605 \times 10^{-5}$ | | $1.9830 \times 10^{-7}$ |

[Dec 1]

| X | 0.000 | Y | 0.000 | Z | 3.000 |
|---|---|---|---|---|---|
| α | −38.139 | β | 0.000 | γ | 0.000 |

[Dec 2]

| X | 0.000 | Y | 6.719 | Z | 1.359 |
|---|---|---|---|---|---|
| α | 45.083 | β | 0.000 | γ | 0.000 |

[Dec 3]

| X | 0.000 | Y | 7.851 | Z | −3.335 |
|---|---|---|---|---|---|
| α | 15.737 | β | 0.000 | γ | 0.000 |

[Dec 4]

| X | 0.000 | Y | 10.386 | Z | −0.821 |
|---|---|---|---|---|---|
| α | 45.746 | β | 0.000 | γ | 0.000 |

[Dec 5]

| X | 0.000 | Y | 15.400 | Z | 4.064 |
|---|---|---|---|---|---|
| α | 0.000 | β | 0.000 | γ | 0.000 |

[Dec 6]

| X | 0.000 | Y | 23.609 | Z | −3.934 |
|---|---|---|---|---|---|
| α | 0.000 | β | 0.000 | γ | 0.000 |

[Dec 7]

| X | 0.000 | Y | 23.609 | Z | 4.064 |
|---|---|---|---|---|---|
| α | 0.000 | β | 0.000 | γ | 0.000 |

| Zooming space | WE | ST | TE |
|---|---|---|---|
| d1 | 5.4653 | 3.0243 | 0.8800 |
| d2 | 1.2847 | 2.0545 | 0.7600 |
| d3 | 1.0000 | 2.6712 | 6.1100 |

Figure 10:
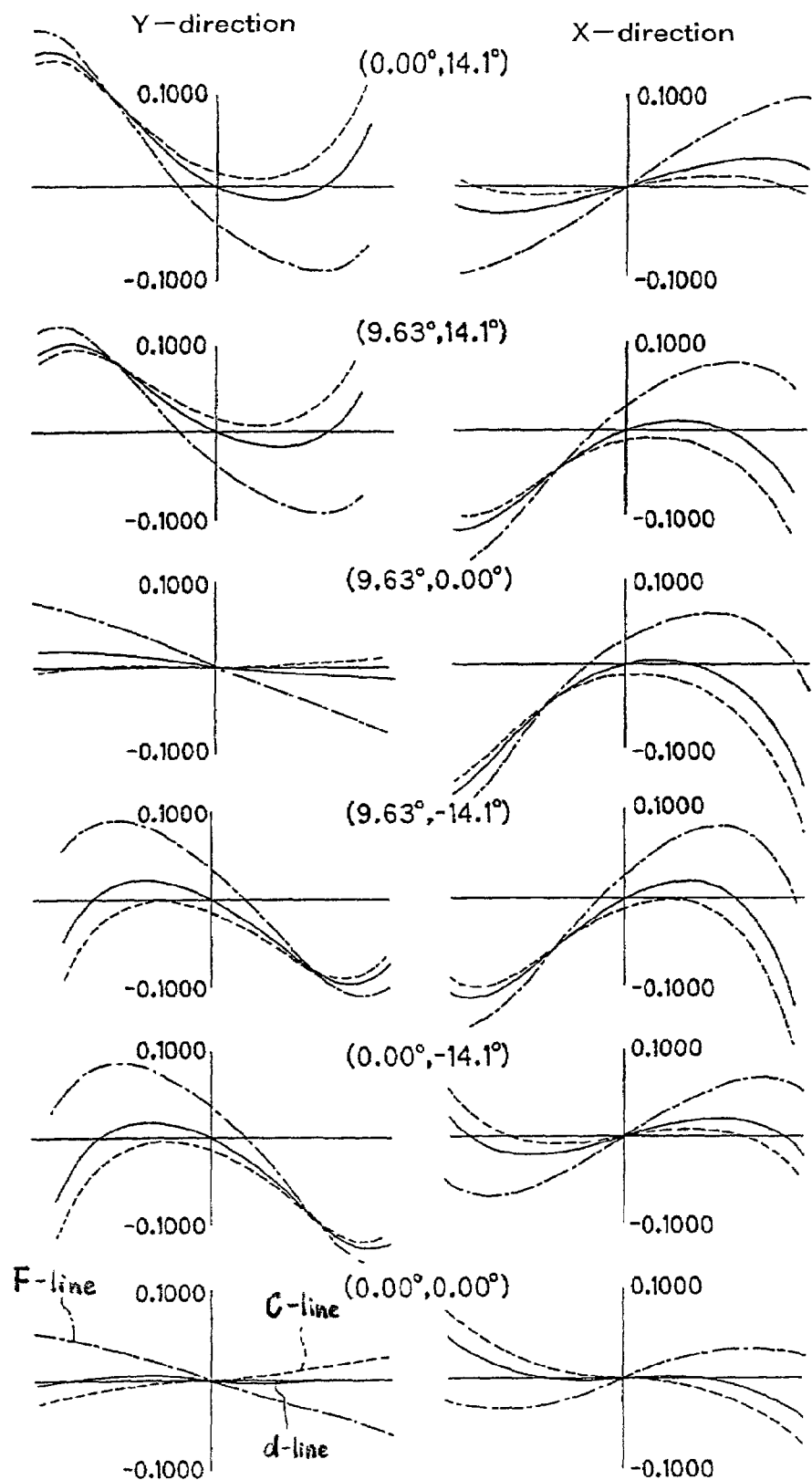
FIG. 10 is a graphical view of a lateral aberration of the first numerical example of this invention at a wide angle end.
Figure 11:
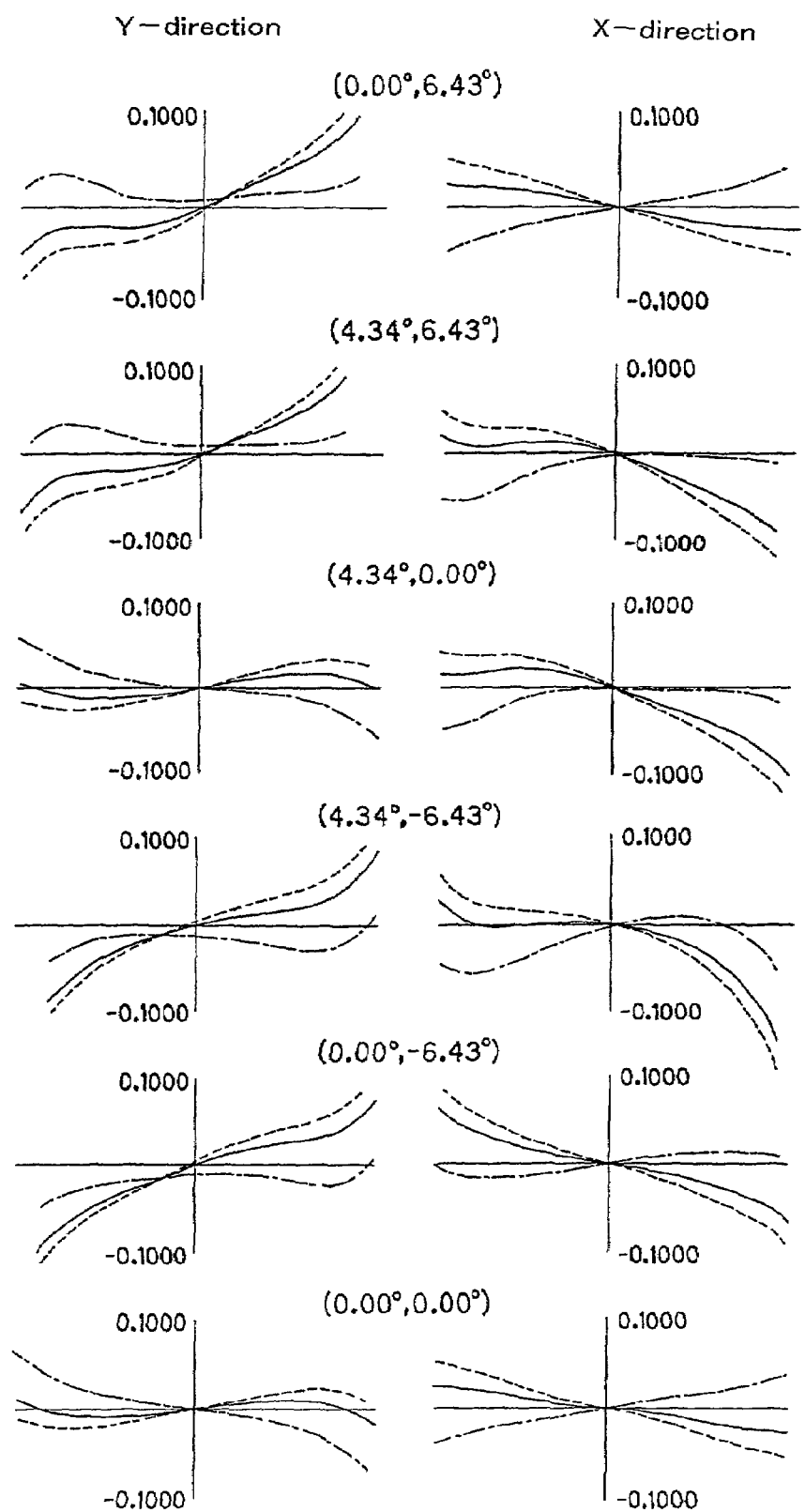
FIG. 11 is a graphical view of a lateral aberration of the first numerical example of this invention at a standard state.
Figure 12:
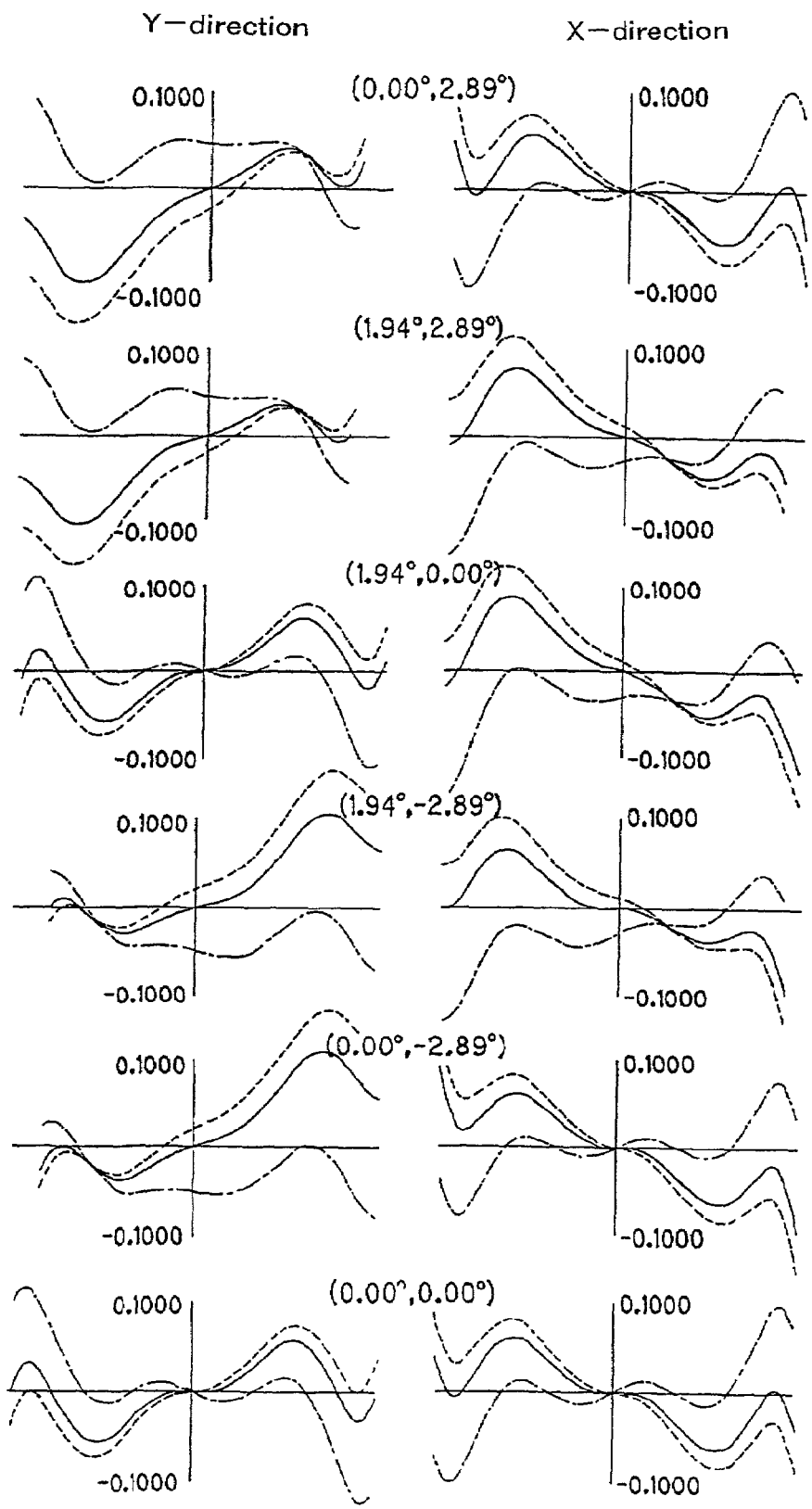
FIG. 12 is a graphical view of a lateral aberration of the first numerical example of this invention at a telephoto end.
Figure 13:
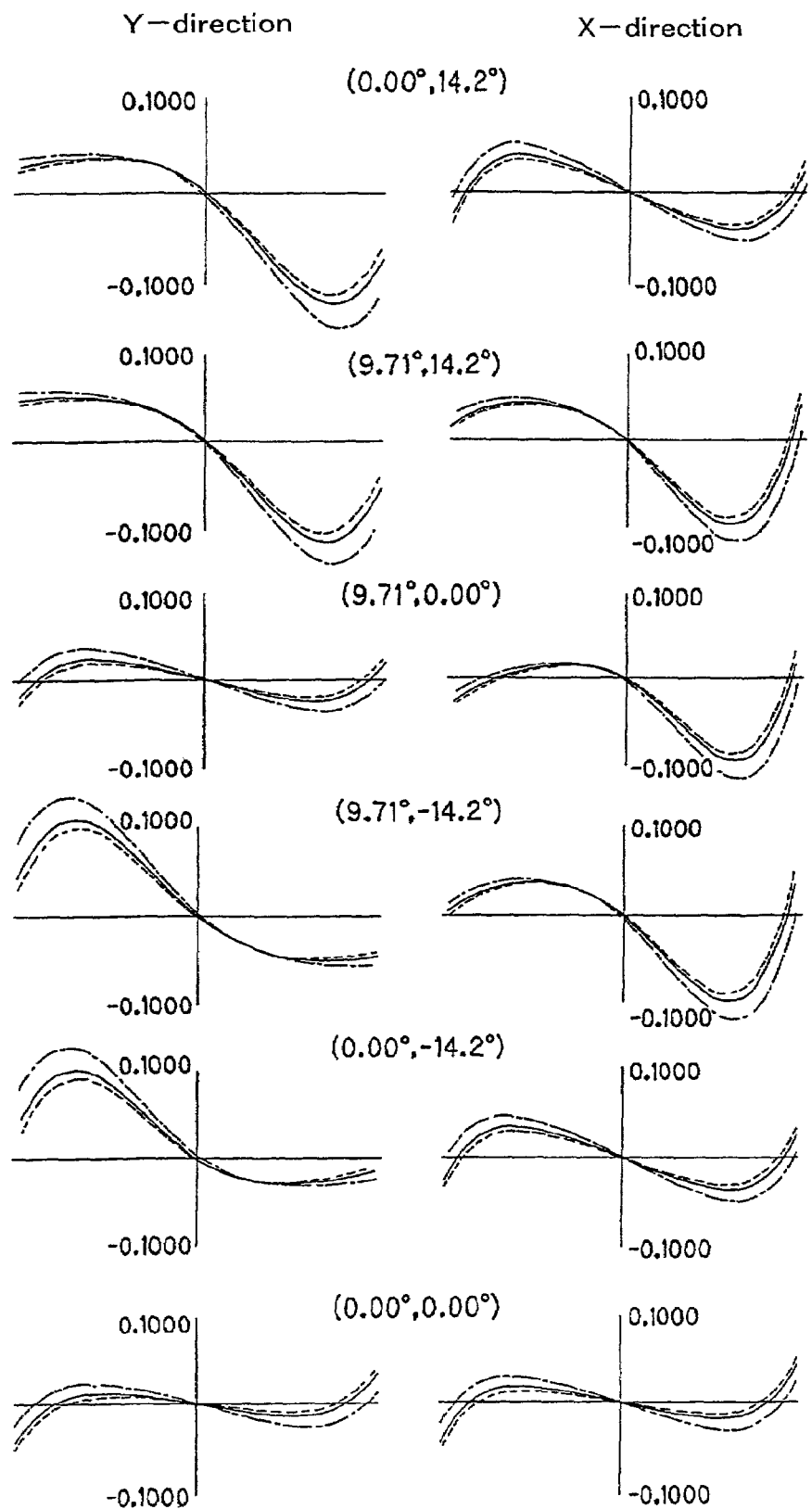
FIG. 13 is a graphical view of a lateral aberration of the second numerical example of this invention at a wide angle end.
Figure 14:
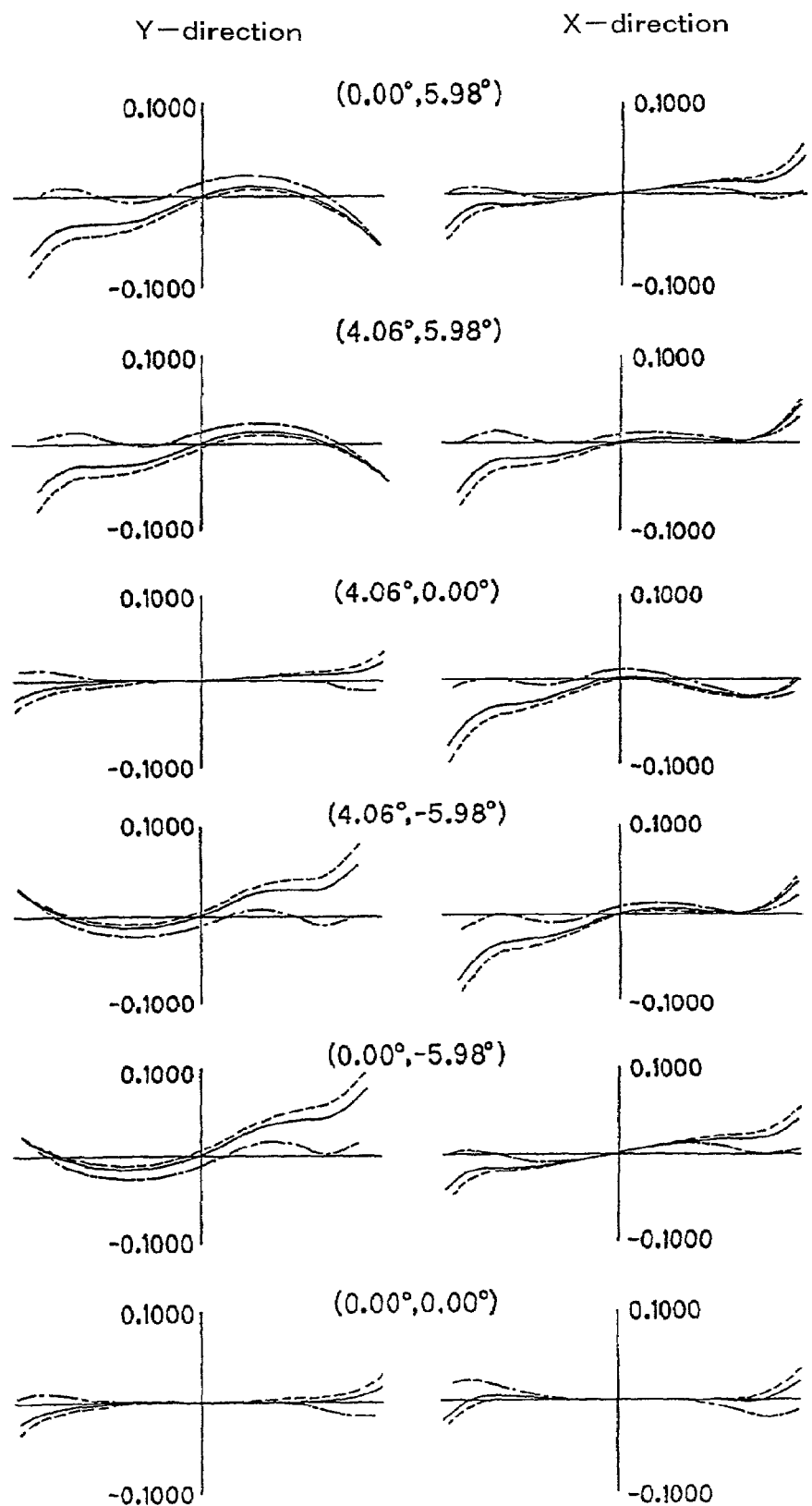
FIG. 14 is a graphical view of a lateral aberration of the second numerical example of this invention at a standard state.
Figure 15:
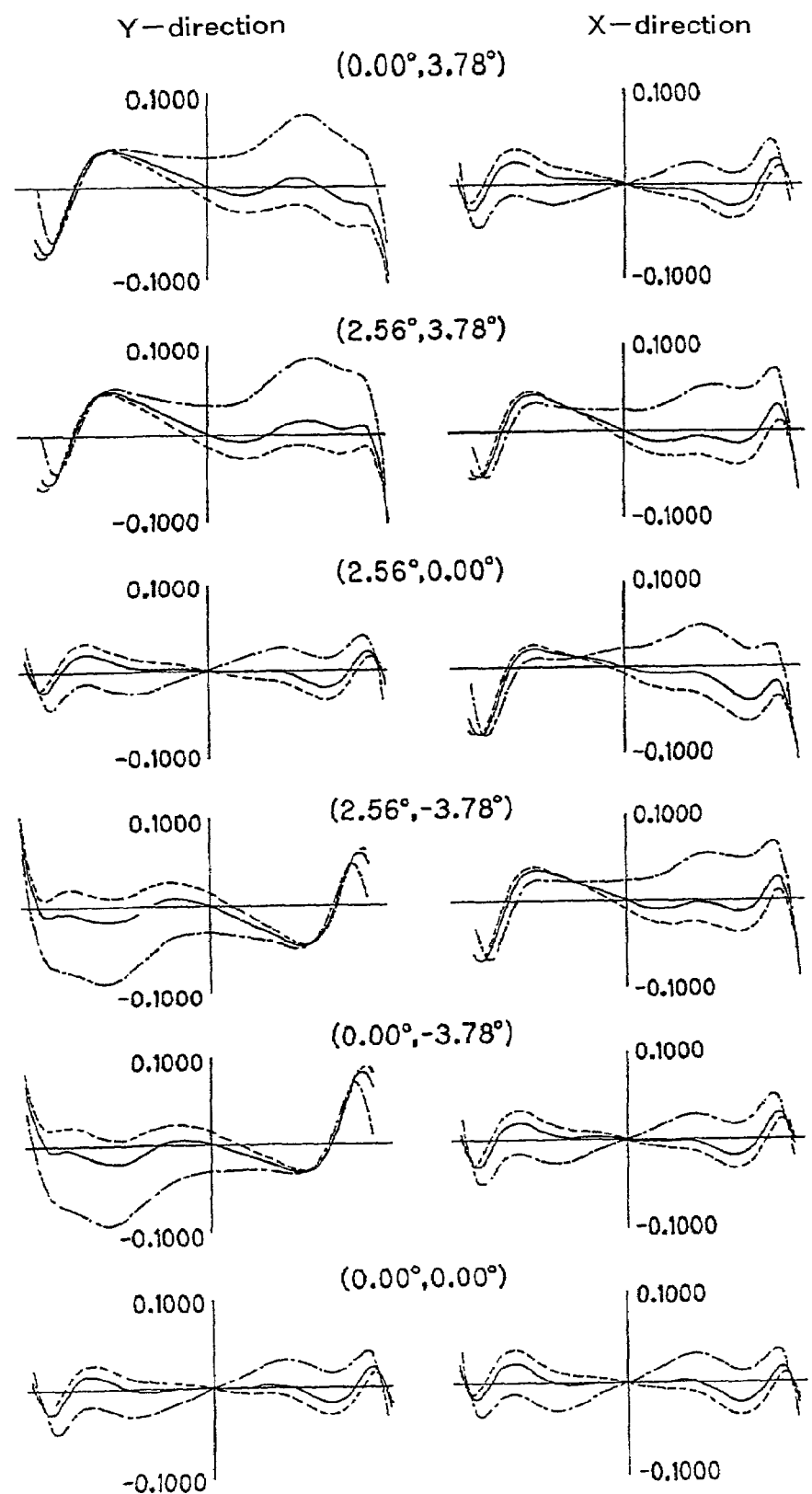
FIG. 15 is a graphical view of a lateral aberration of the second numerical example of this invention at a telephoto end.
Figure 16:
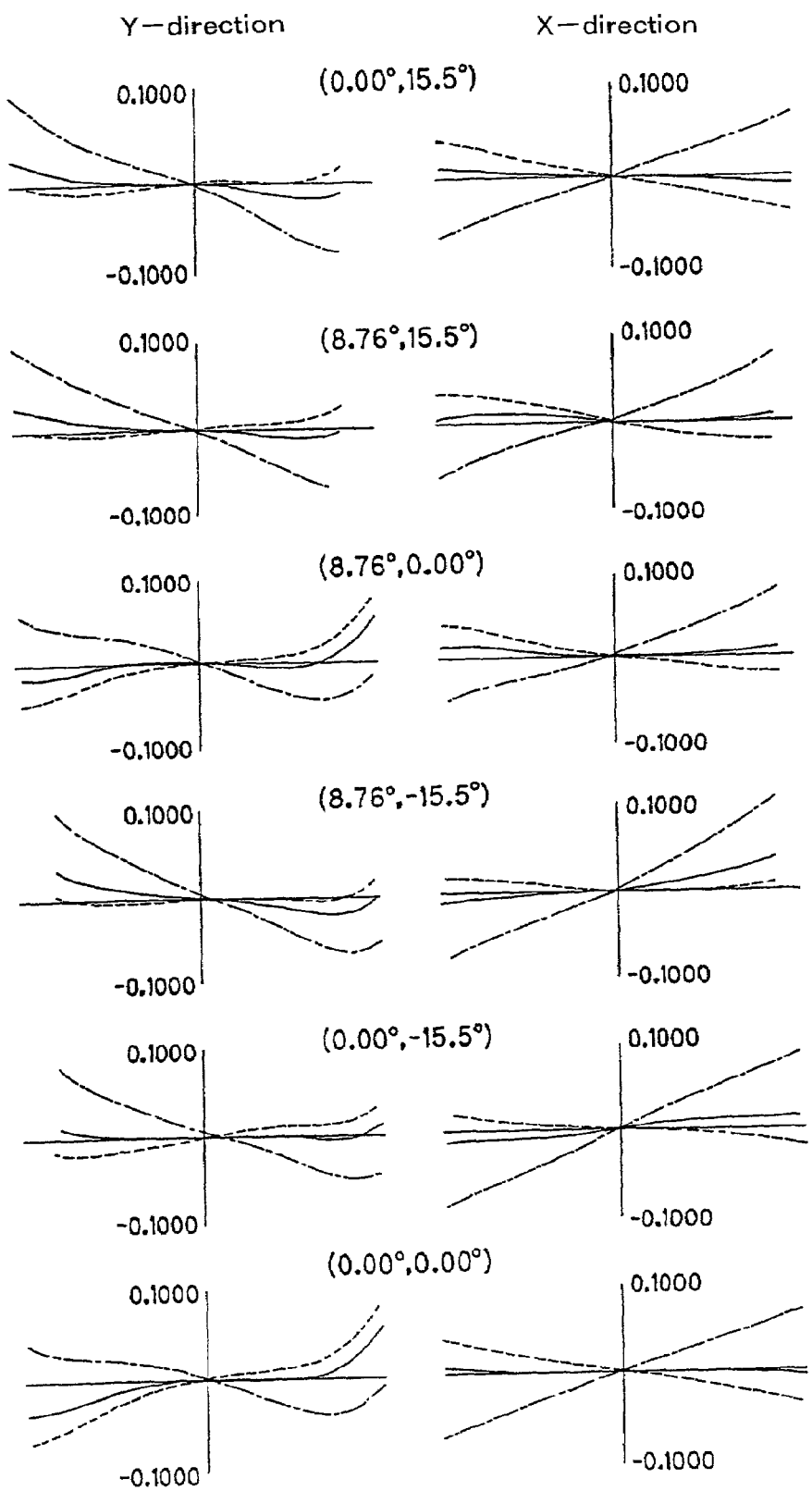
FIG. 16 is a graphical view of a lateral aberration of the third numerical example of this invention at a wide angle end.
Figure 17:
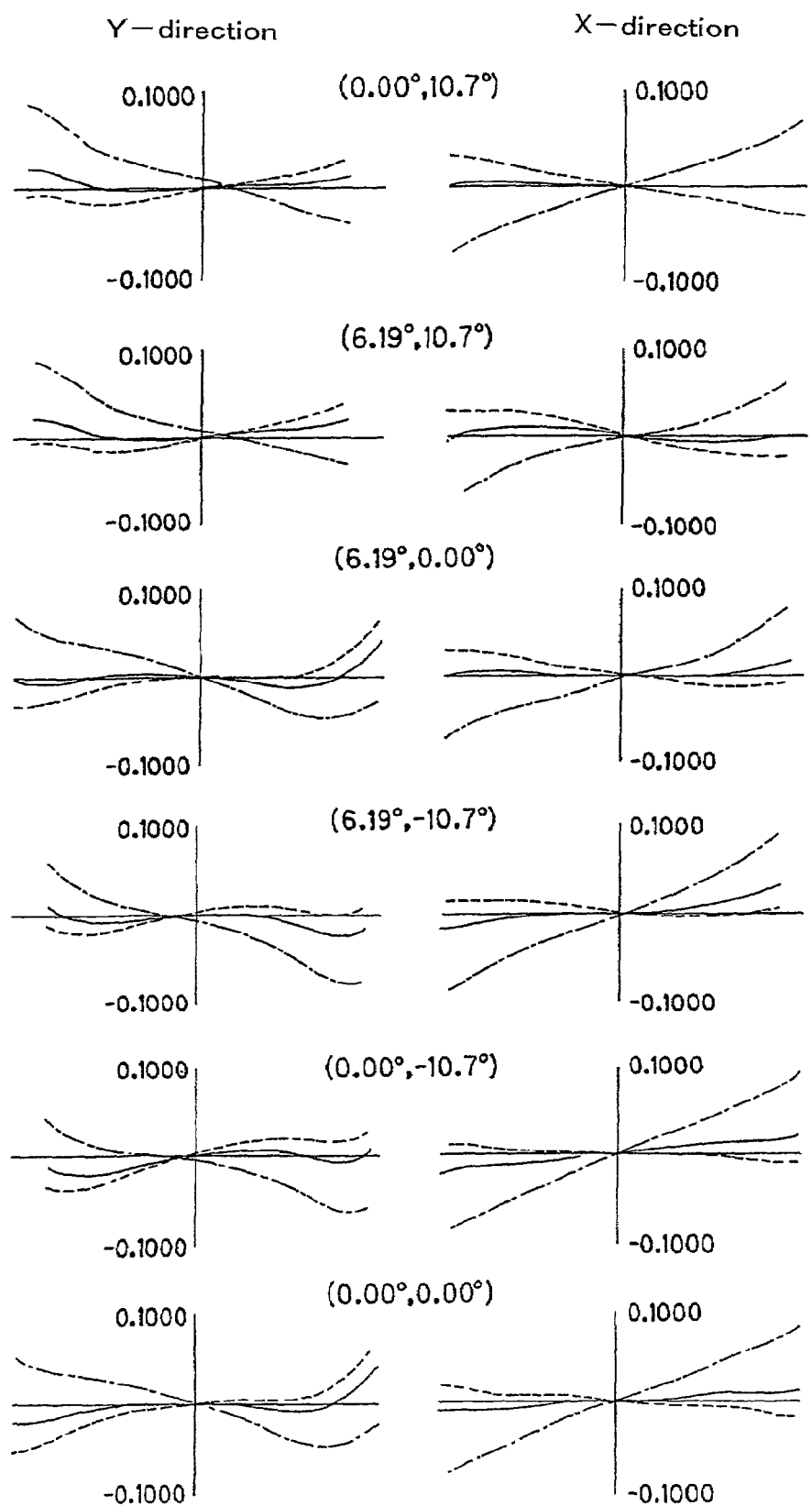
FIG. 17 is a graphical view of a lateral aberration of the third numerical example of this invention at a standard state.
Figure 18:
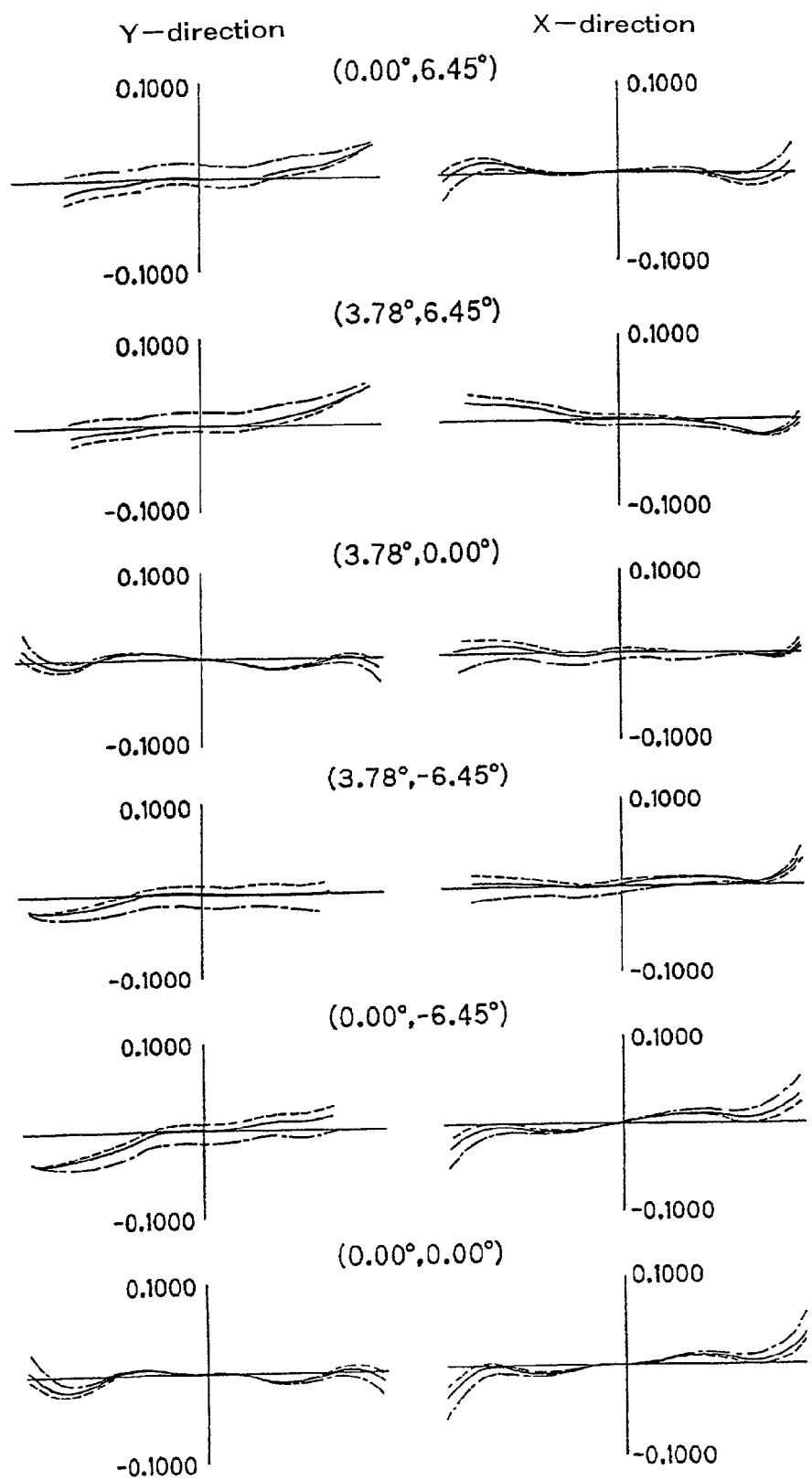
FIG. 18 is a graphical view of a lateral aberration of the third numerical example of this invention at a telephoto end.

FIG. 10 through FIG. 12, FIG. 13 through FIG. 15 and FIG. 16 through FIG. 18 are graphs of lateral aberration of the numerical examples 1,2 and 3, respectively. Among them, FIG. 10, 13 and 16 shows the wide angle end, FIG. 11, 14 and 17 shows the standard state and FIG. 12, 15 and 18 shows the telephoto end, respectively. In these figures, the numbers written in parentheses are a field angle in the horizontal direction (X direction) and a field angle in the vertical direction(Y direction) from left to right. Each graph shows, in turn from bottom to top, the lateral aberration at the center of the image surface, at a position approximately −70% of the maximum field angle in Y direction, at a position approximately 70% of the maximum field angle in X direction and approximately −70% of the maximum field angle in Y direction, at a position approximately 70% of the maximum field angle in X direction, at a position approximately 70% of the maximum field angle in X direction and approximately 70% of the maximum field angle in Y direction, and at a position approximately 70% of the maximum field angle in Y direction.

The values of parameters appears in above described conditions are shown below.

TABLE 1

| | example 1 | Example 2 | example 3 |
|---|---|---|---|
| $d \cdot fw/ft^2$ | 0.12 | 0.19 | 0.33 |
| ft/fw | 5.00 | 3.82 | 2.27 |
| fw/fneg | 0.67 | 0.10 | — |
| \|fN/fP\| | 0.53 | 0.91 | — |
| fw/fpos | — | — | 1.88 |

TABLE 1-continued

|  | example 1 | Example 2 | example 3 |
|---|---|---|---|
| \|fP/fN\| | — | — | 1.42 |
| \|2n · tan θ · \|h/r\| | | | |
| first reflecting surface | X-direction 0.099(positive) Y-direction 0.112(positive) | X-direction 0.047(positive) Y-direction 0.050(positive) | X-direction 0.086(negative) Y-direction 0.016(negative) |
| second reflecting surface | X-direction 0.287(positive) Y-direction 0.014(negative) | X-direction 0.047(positive) Y-direction 0.050(positive) | X-direction 0.444(negative) Y-direction 0.146(negative) |
| third reflecting surface | X-direction 0.096(negative) Y-direction 0.027(negative) | — — | X-direction 0.149(positive) Y-direction 0.096(positive) |
| θ | | | |
| first reflecting surface | 38.02° | 37.99° | 38.14° |
| second reflecting surface | 58.98° | 52.00° | 58.64° |
| third reflecting surface | 29.48° | — | 29.29° |
| φ | 0.0081° | 0° | 0° |
| A | 45° | 180° | 45.746° |

Figure 19:
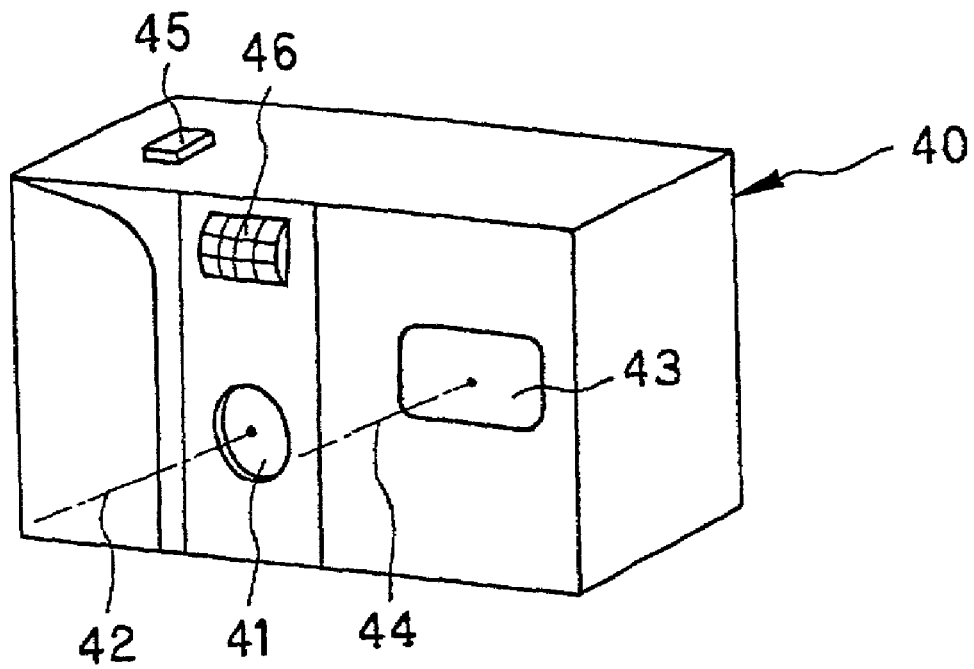
FIG. 19 is a perspective front oblique view of an example of a digital camera equipped with a real image mode variable magnification finder according to this invention.
Figure 20:
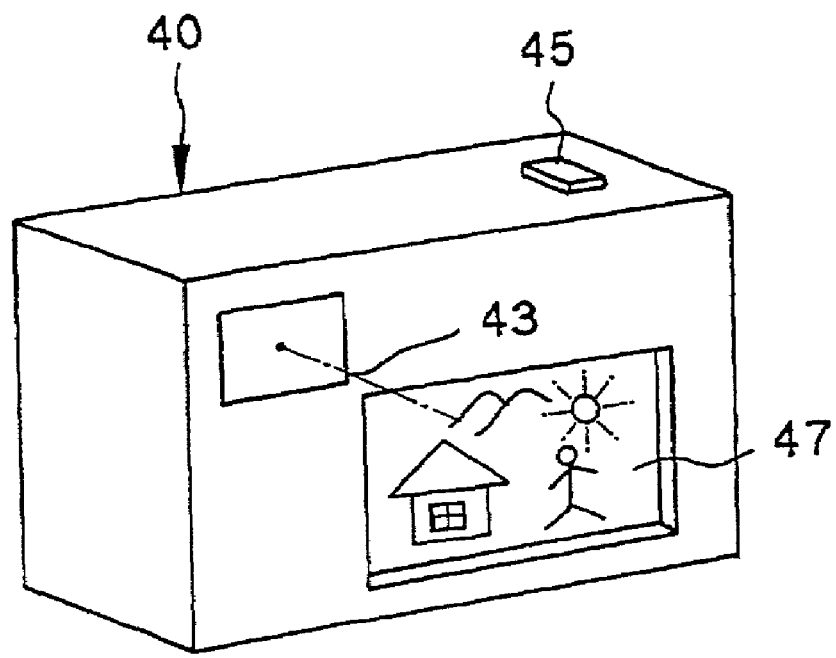
FIG. 20 is perspective rear oblique view of the digital camera shown in FIG. 19.
Figure 21:
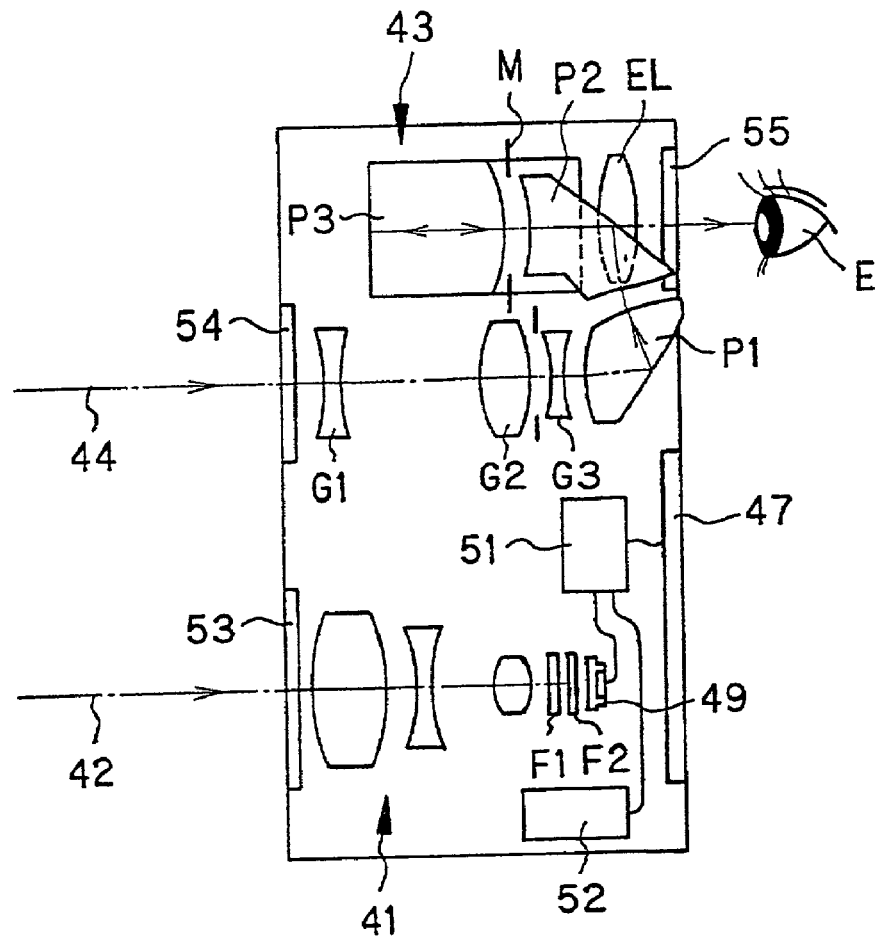
FIG. 21 is a sectional view of the digital camera shown in FIG. 19.

The real image mode finder optical system according to this invention may be used as a finder for a picture taking apparatus. FIG. 19 through 21 are the diagrammatic figures of an example of a digital camera equipped with a finder optical system according to this invention. FIG. 19 is a perspective front oblique view of the digital camera 40, FIG. 20 is a perspective rear oblique view the digital camera 40, and FIG. 21 is a schematic sectional view of the inside of the digital camera 40, respectively. This digital camera 40 has a picture taking optical system 41 having a picture taking optical path 42, a finder optical system 43 having a finder optical path 44, shutter release button 45, electronic flash 46 and a liquid crystal display monitor 47. By pressing the release button 45 on the top of the camera 40, a picture of an object is taken by the zoom lens system (picture taking optical system) 41. The finder optical system 43 disposed on the finder optical path 44 may be the numerical example 2 of this invention, and the user observes the image of the object with its eye E through the ocular optical system EL. The image of the object formed by the picture taking optical system 41 focused on the electronic image pickup device 49 such as CCD imager through filters F1 and F2 such as a optical low-pass filter, infrared ray cutting filter etc. The image received by the image pickup device 49 is displayed on the monitor 47 equipped on the back of the camera as an electronic image through the processor 51. A recording medium 52 is connected to the processor 51, which is capable of recording the electronic image. The recording medium 52 may be provided separately with the processor 51, and may be one of a floppy disc, memory card, magnet-optical disc, and so forth, which is possible to store the image. The camera may be composed as a photographic camera by replacing the CCD imager 49 with a silver-salt film. Cover plates 53, 54, and 55 are arranged on the entrance side of the picture taking optical system 41, the finder optical system 43, and the exit side of the ocular optical system EL.

The digital camera equipped with the finder optical system according to this invention is small in thickness and has a high zooming ratio.

Although this invention has been described in detail with respect to the foregoing examples, this invention is not limited the above examples but, on the contrary, various modifications are possible to without departing from the spirit of this invention. All such modifications as would be obvious to one of ordinary skill in the art are intended to be included within the scope of the following claims.

The invention claimed is:

1. A real image mode variable magnification finder optical system comprising:
    a variable magnification objective optical system having a positive optical power; an ocular optical system having a positive optical power; and
    a plurality of reflecting surfaces for erecting an image of an object to be observed;
    said objective optical system including a plurality of movable lens units each of which has an aspherical surface, and at least one reflecting surface which is a rotationally asymmetric surface and has an optical power;
    said finder optical system satisfying the following condition:

$$0.02 < d(fw/ft^2) < 0.4 \qquad (1)$$

where d is a distance from a first surface of said objective optical system to one of said reflecting surfaces positioned nearest to an object measured along an axial chief ray at a wide angle end, fw is a focal length of said objective optical system at a wide angle end, and ft is a focal length of said objective optical system at a telephoto end.

2. A real image mode variable magnification finder optical system according to claim 1, further satisfying the following condition:

$$2.5 \leq ft/fw \leq 10 \qquad (2).$$

3. A real image mode variable magnification finder optical system according to claim 1, wherein said objective optical system includes at least three lens units.

4. A real image mode variable magnification finder optical system according to claim 1, wherein said movable lens units include no reflecting surfaces.

5. A real image mode variable magnification finder optical system according to claim 1, wherein said objective optical system comprises a negative subsystem including at least one positive lens unit and two negative lens units.

6. A real image mode variable magnification finder optical system according to claim 5, wherein said negative subsystem is disposed at an object side of said plurality of reflecting surfaces.

7. A real image mode variable magnification finder optical system according to claim 5, wherein said negative subsystem includes no lens element having an reflecting surface.

8. A real image mode variable magnification finder optical system according to claim 5, wherein said negative subsystem satisfies the following condition:

$$0.02 < fw/fneg < 0.9 \qquad (3)$$

where fneg is a focal length of said negative subsystem.

9. A real image mode variable magnification finder optical system according to claim 5, wherein said negative subsystem satisfies the following condition:

$$0.2 < |fN/fP| < 1.7 \qquad (4)$$

where fP is a focal length of a positive lens unit which has a strongest positive optical power in said negative subsystem and fN is a focal length of a negative lens unit which has a strongest negative optical power in said negative subsystem.

10. A real image mode variable magnification finder optical system according to claim 1, wherein said objective optical system comprises a positive subsystem including at least two positive lens units and one negative lens unit.

11. A real image mode variable magnification finder optical system according to claim 10, wherein said positive subsystem is disposed at an object side of said plurality of reflecting surfaces.

12. A real image mode variable magnification finder optical system according to claim 10, wherein said positive subsystem includes no lens element having an reflecting surface.

13. A real image mode variable magnification finder optical system according to claim 10, wherein said positive subsystem satisfies the following condition:

$$0.7 < fw/fpos < 3.0 \tag{5}$$

where fpos is a focal length of said positive subsystem.

14. A real image mode variable magnification finder optical system according to claim 10, wherein said positive subsystem satisfies the following condition:

$$0.8 < |fP/fN| < 2.5 \tag{6}$$

where fP is a focal length of a positive lens unit which has a strongest positive optical power in said positive subsystem and fN is a focal length of a negative lens unit which has a strongest negative optical power in said positive subsystem.

15. A real image mode variable magnification finder optical system according to claim 10, wherein at least one of lens units included in said positive subsystem is fixed on an optical axis during zooming operation.

16. A real image mode variable magnification finder optical system according to claim 1, wherein said objective optical system comprises, in order from an object side, a negative first lens unit, a positive second lens unit and a positive third lens unit, and at least said first lens unit is fixed on an optical axis during zooming operation.

17. A real image mode variable magnification finder optical system according to claim 1, wherein said objective optical system comprises, in order from an object side, a positive first lens unit, a negative second lens unit and a negative third lens unit.

18. A real image mode variable magnification finder optical system according to claim 1, wherein said objective optical system comprises, in order from an object side, a negative first lens unit, a positive second lens unit and a negative third lens unit.

19. A real image mode variable magnification finder optical system according to claim 18, wherein said negative first lens unit is fixed on an optical axis during zoom operation.

20. A real image mode variable magnification finder optical system according to claim 18, wherein a composite focal length of said first, second and third lens units is negative.

21. A real image mode variable magnification finder optical system according to claim 1, wherein at least one of said reflecting surfaces disposed on an object side of an intermediate image formed by said objective optical system has a positive optical power and satisfies the following condition:

$$0.015 < |2n \cdot \tan \theta \cdot Ih/r| < 1.5 \tag{7}$$

where r is a radius of curvature of said at least one reflecting surface at a point that an axial chief ray intersects said reflecting surface, n is a refractive index of a medium arranged on both an entrance and a reflection side of said reflecting surface at a wavelength of the d-line, θ is a reflection angle on said reflecting surface, and Ih is a length of a diagonal line of a field mask arranged on or in the vicinity of said intermediate image.

22. A real image mode variable magnification finder optical system according to claim 1, wherein at least one of said reflecting surfaces disposed on an object side of an intermediate image formed by said objective optical system has a negative optical power and satisfies the following condition:

$$0.015 < |2n \cdot \tan \theta \cdot Ih/r| < 1.5 \tag{8}$$

where r is a radius of curvature of said at least one reflecting surface at a point that an axial chief ray intersects said reflecting surface, n is a refractive index of a medium arranged on both an entrance and a reflection side of said reflecting surface at a wavelength of the d-line, θ is a reflection angle on said reflecting surface, and Ih is a length of a diagonal line of a field mask arranged on or in the vicinity of said intermediate image.

23. A real image mode variable magnification finder optical system according to claim 1, wherein at least one positive reflecting surface and at least one negative reflecting surface which are disposed on an object side of an intermediate image formed by said objective optical system are included in said plurality of reflecting surfaces.

24. A real image mode variable magnification finder optical system according to claim 23, wherein said plurality of reflecting surfaces include a positive reflecting surface and a negative reflecting surface both satisfying the following condition:

$$0.015 < |2n \cdot \tan \theta \cdot Ih/r| < 1.5 \tag{9}$$

where r is a radius of curvature of said positive and negative reflecting surfaces at a point that an axial chief ray intersects said reflecting surfaces, n is a refractive index of a medium arranged on both an entrance and a reflection side of said reflecting surfaces at a wavelength of the d-line, θ is a reflection angle on said reflecting surfaces, and Ih is a length of a diagonal line of a field mask arranged on or in the vicinity of said intermediate image.

25. A real image mode variable magnification finder optical system according to claim 1, wherein only two reflecting surfaces are arranged on an object side of an intermediate image formed by said objective optical system.

26. A real image mode variable magnification finder optical system according to claim 1, wherein only three reflecting surfaces are arranged on an object side of an intermediate image formed by said objective optical system.

27. A real image mode variable magnification finder optical system according to claim 1, wherein at least one of said plurality of reflecting surfaces comprises a totally reflecting surface.

28. A real image mode variable magnification finder optical system according to claim 1, wherein at least one of said plurality of reflecting surfaces satisfies the following condition:

$$5° < \theta < 60° \tag{10}$$

where θ is a reflection angle of an axial chief ray.

29. A real image mode variable magnification finder optical system according to claim 1, wherein a reflecting surface disposed on an object side of an intermediate image formed by said objective optical system is formed on a prism whose entrance surface is formed as a rotationally asymmetric refracting surface.

30. A real image mode variable magnification finder optical system according to claim 1, wherein a reflecting surface disposed on an object side of an intermediate image formed by said objective optical system is formed on a prism whose exit surface is formed as a rotationally asymmetric refracting surface.

31. A real image mode variable magnification finder optical system according to claim 1, wherein a reflecting surface disposed on an object side of an intermediate image formed by said objective optical system is fixed on an optical axis during zooming operation.

32. A real image mode variable magnification finder optical system according to claim 1, wherein said plurality of reflecting surfaces includes a roof shaped reflecting surface and said plurality of reflecting surfaces reflect a light ray six times in total.

33. A real image mode variable magnification finder optical system according to claim 1, wherein said plurality of reflecting surfaces form a Porro-prism which reflect a light ray four times in total.

34. A real image mode variable magnification finder optical according to claim 1, wherein an exit pupil of said objective optical system is rotationally symmetrically corrected.

35. A real image mode variable magnification finder optical according to claim 1, wherein said finder optical system is so configured that an axial chief rays entering said objective optical system and an axial chief ray exiting said ocular optical system are parallel or substantially parallel with each other.

36. A real image mode variable magnification finder optical system according to claim 35, wherein an angle between the axial chief rays entering said objective optical system and the axial chief ray exiting said ocular optical system satisfies the following condition:

$$0° \leq \varnothing < 20° \tag{11}$$

37. A real image mode variable magnification finder optical system according to claim 1, wherein an angle α between an axial chief ray entering said objective optical system and an axial chief ray entering an intermediate image formed by said objective optical system satisfies the following condition:

$$15° < \alpha < 75° \text{ or } 105° < \alpha < 180° \tag{12}$$

38. A real image mode variable magnification finder optical system according to claim 1, wherein said objective optical system of said finder optical system forms only one intermediate image.

39. A real image mode variable magnification finder optical system according to claim 1, wherein at least two rotationally asymmetric reflecting surface are disposed on an object side of an intermediate image formed by said objective optical system for erecting image.

40. A picture taking apparatus comprising:
a picture taking optical system; and
a variable magnification finder optical system provided aside from said picture taking optical system and so arranged that an axial chief ray entering said picture taking optical system and an axial chief ray entering said finder optical system are parallel or substantially parallel with each other;
wherein said variable magnification finder optical system is said finder optical system according to claim 1.

41. A real image mode variable magnification finder optical system comprising: a variable magnification objective optical system having a positive optical power; an ocular optical system having a positive optical power; and
a plurality of reflecting surfaces for erecting an image of an object to be observed;
said objective optical system including a plurality of movable lens units each of which has an aspherical surface, and at least one reflecting surface which is a rotationally asymmetric surface and has an optical power;
said finder optical system satisfying the following conditions:

$$0.02 < d(fw/ft^2) < 0.7 \tag{1'}$$

$$3.5 \leq ft/fw \leq 10 \tag{2'}$$

where d is a distance from a first surface of said objective optical system to one of said reflecting surface positioned nearest to an object measured along an axial chief ray at a wide angle end, fw is a focal length of said objective optical system at a wide angle end, and ft is a focal length of said objective optical system at a telephoto end.

42. A real image mode variable magnification finder optical system comprising:
a variable magnification objective optical system having a positive optical power; an ocular optical system having a positive optical power; and
a plurality of reflecting surfaces for erecting an image of an object to be observed;
said objective optical system comprising, in order from an object side, a negative front subsystem including a plurality of movable lens units and a rear subsystem including at least one reflecting surface which is a rotationally asymmetric surface and has a positive optical power and satisfying the following condition:

$$0.02 < d(fw/ft^2) < 0.7 \tag{1'}$$

where d is a distance from a first surface of said objective optical system to one of said reflecting surfaces positioned nearest to an object to be observed measured along an axial chief ray at a wide angle end, fw is a focal length of said objective optical system at a wide angle end, and ft is a focal length of said objective optical system at a telephoto end.

43. A real image mode variable magnification finder optical system comprising:
a variable magnification objective optical system having a positive optical power; an ocular optical system having a positive optical power; and
a plurality of reflecting surfaces for erecting an image of an object to be observed;
said objective optical system comprising, in order from an object side, a negative front subsystem including a plurality of movable lens units and a rear subsystem including at least one reflecting surface which is a rotationally asymmetric surface and has a positive optical power, and satisfying the following condition:

$$2.5 \leq ft/fw \leq 10.0 \tag{2}$$

where fw is a focal length of said objective optical system at a wide angle end, and ft is a focal length of said objective optical system at a telephoto end.

* * * * *